(12) United States Patent
Takahira

(10) Patent No.: US 7,177,465 B1
(45) Date of Patent: Feb. 13, 2007

(54) METHOD OF COMPRESSING/EXTENDING COLOR REPRODUCING SPACE, COLOR REPRODUCING METHOD AND COLOR REPRODUCING APPARATUS

(75) Inventor: Masayuki Takahira, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 152 days.

(21) Appl. No.: 09/617,920

(22) Filed: Jul. 17, 2000

(30) Foreign Application Priority Data

Jul. 16, 1999 (JP) ............... 11-203254
Jul. 28, 1999 (JP) ............... 11-213513

(51) Int. Cl.
*G06K 9/36* (2006.01)

(52) U.S. Cl. .................. 382/166; 358/1.9
(58) Field of Classification Search ........ 382/162–167; 358/1.9, 515–540; 345/589–610
See application file for complete search history.

(56) References Cited

U.S. PATENT DOCUMENTS

| | | | |
|---|---|---|---|
| 5,317,426 A * | 5/1994 | Hoshino | 358/518 |
| 5,734,745 A | 3/1998 | Ohneda | |
| 5,734,802 A | 3/1998 | Maltz et al. | |
| 5,933,253 A * | 8/1999 | Ito et al. | 358/518 |
| 5,937,089 A * | 8/1999 | Kobayashi | 382/167 |
| 5,987,165 A | 11/1999 | Matsuzaki et al. | |
| 5,991,511 A * | 11/1999 | Granger | 382/167 |
| 6,151,136 A * | 11/2000 | Takemoto | 382/163 |
| 6,204,939 B1 * | 3/2001 | Lin et al. | 358/518 |
| 6,301,383 B1 * | 10/2001 | Ito et al. | 382/167 |
| 6,437,792 B1 * | 8/2002 | Ito et al. | 345/600 |

FOREIGN PATENT DOCUMENTS

| | | |
|---|---|---|
| JP | 3-158075 A | 7/1991 |
| JP | 5-298437 A | 11/1993 |
| JP | 7-123283 A | 5/1995 |
| JP | 9-135360 A | 5/1997 |
| JP | 2845523 B | 10/1998 |

* cited by examiner

Primary Examiner—Ishrat Sherali
(74) Attorney, Agent, or Firm—Sughrue Mion, PLLC

(57) ABSTRACT

Method of compressing/extending a color reproducing space which compresses or extends chroma of a first color gamut in a same hue plane. The color reproducing method and apparatus produces a third transformation definition by transforming a first color gamut represented by a first transformation definition within a second color gamut represented by a second transformation definition such that the gradation is preserved, produces a fourth transformation definition by transforming a second gamut within the first color gamut such that gradation is preserved and produces a fifth transformation definition in the second transformation definition by providing an inverse transformation from the second transformation definition into the first transformation definition to the first color gamut and then produces a color reproduction target transformation definition for transformation from the first transformation to the second transformation definition by mixing the second color gamuts represented by the third transformation definition and the fifth transformation definition.

41 Claims, 13 Drawing Sheets

| | R | Y | G | C | B | M |
|---|---|---|---|---|---|---|
| $Adj_h$ | 0 | -5 | 0 | 0 | 0 | 0 |
| $Adj_s$ | 0 | 0 | 10 | 0 | -30 | -10 |
| $Adj_v$ | 0 | 0 | 20 | 30 | 10 | 0 |

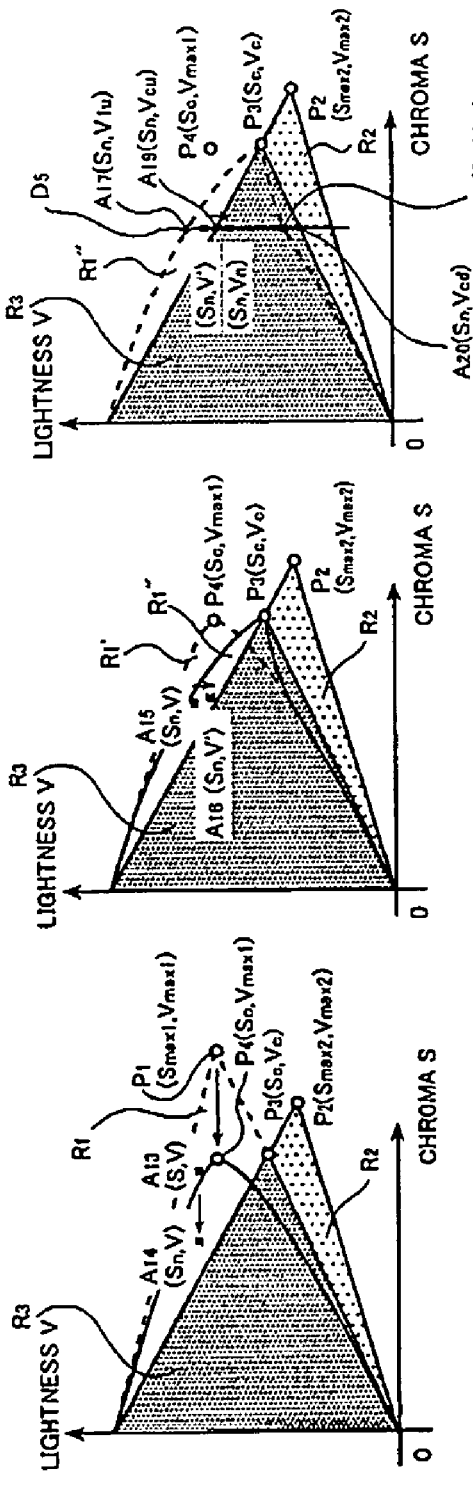

METHOD OF COMPRESSING/EXTENDING COLOR REPRODUCING SPACE, COLOR REPRODUCING METHOD AND COLOR REPRODUCING APPARATUS

BACKGROUND OF THE INVENTION

This invention relates to the technical field of a method of compressing/extending color reproducing space, a color reproducing method and a color reproducing apparatus.

More particularly, the present invention relates to a method of performing transformation for allowing color reproducing spaces to correspond with each other when shapes and sizes of the respective color reproducing spaces of image input/output devices are different from each other which is capable of corresponding with an image input/output device having a different color reproducing space such that the initial color gamut is maintained in a smooth manner and the initial color appearance and gradation are preserved and is, moreover, capable of adjusting such correspondence as desired. More specifically, the present invention relates to a color reproducing method and a color reproducing apparatus which are adapted to be utilized in at least one of the cases in which print image data is outputted externally as monitor image data or the similar image data and the thus externally outputted image data is transformed back to the print image data which is to be outputted.

Heretofore, a color CRT monitor, a color liquid crystal monitor and the like and a color printer and the like have been popularized and each has widely been used as an image input/output device (hereinafter referred to simply as "image I/O device") of a color image.

Such image I/O devices can either represent a color image having a desired color by controlling image data ordinarily related to R (red), G (green) and B (blue) or C (cyan), M (magenta) and Y (yellow) or output the color image as a print. However, since color image data as described above are dependent on output characteristics, spectral sensitivity characteristics of the image I/O device, when the color image data is outputted to the image I/O device having different characteristics, it is necessary to perform color transformation of image data taking such characteristics into consideration. Particularly, since spectral sensitivity characteristics of the color CRT monitor or the color liquid crystal monitor and those of the color printer are substantially different from each other, it is necessary to optimally perform color transformation to allow color appearances to coincide with each other such that, for example, the color of the image represented on the color CRT monitor coincides to some extent with the color of the image outputted to the color printer.

In order to perform such color transformation, it is necessary to allow a color reproducing space which can be represented on the image I/O device to correspond to the color reproducing space of the image I/O device to which the initial data is to be transformed; namely, the color transformation which can construct a one-to-one mapping between color points constituting an inside area of the color reproducing space represented on the image I/O device and color points in the color reproducing space of the image I/O device to which the initial data is to be transformed; that is, a method of compressing or extending the color reproducing space is necessitated. Moreover, in such a case, it is necessary to compress or extend the color reproducing space such that not only hue, but also lightness and chroma are maintained in a color gamut in a smooth manner and also the initial color appearance or gradation is preserved, even after the color transformation.

As the color reproducing space as described above, the color reproducing space on a uniform color space to be formed by the image data which does not ordinarily depend on the image I/O device, namely, such as image data of psychometric lightness L* (lightness) and perceived perceived psychometric chromaticities a* b* (hue and chroma) in a CIEL*a*b* color matching system obtained by using tristimulus values (X, Y, Z) of a CIEXYZ colormatching system specified by the International Commission on Illumination (Commission Internationale de l'Étclairage —CIE) or otherwise has been utilized.

By utilizing the color reproducing space on the uniform color space, since, for example, characteristics of color reproducing spaces of these apparatuses are both linear and, therefore, features of color reproducing spaces of these apparatuses are close to each other between the color CRT monitor or the color liquid crystal monitor and the color scanner, correspondence (color matching) between points within the color reproducing spaces can easily be established by compressing or extending the color reproducing space. However, in an additive color mixing system which performs image representation using a transmitted light of apparatuses, such as the color CRT monitor, the color liquid crystal monitor and the like, the color gamut is wide even in a high lightness region thereby outputting a bright color, whereas, in a subtractive color mixing system which performs image representation using a reflected light of apparatuses, such as a color printer and the like, a color with a high chroma can not adequately be outputted in a high chroma range and, moreover, the color gamut is wide rather in a relatively low lightness region so that the color reproducing space is substantially different from that of the additive color mixing system; hence it is difficult to establish a correspondence between the color CRT or the color liquid crystal monitor and the color printer by compressing or extending the color reproducing space.

Moreover, since respective edge portions of the color reproducing spaces of two color printers are each in a nonlinear, roundish form, it is difficult to establish a correspondence between such color printers by compressing or extending the color reproducing space.

With respect to compression or extension of the color reproducing space as described above, Japanese Patent Publication No. 2845523 proposes a simplified method in which the color gamut is extended in accordance with a ratio of color gamuts and, moreover, when the color reproducing space is subjected to extension mapping in a direction of chroma, a mapping transformation is performed only on a peripheral portion and not performed on the central portion in which color gamuts are overlapped. As another case, Unexamined Published Japanese Patent Application (kokai) No. 5-298437 proposes an image processing apparatus in which only chroma is compressed while hue and lightness on the color reproducing space are fixed. However, none of the above-cited Japanese Patent publication and application establishes a correspondence between the color reproducing spaces taking into full consideration the form of color reproducing space to which the initial data is to be transformed or performs processing of adjusting the correspondence between color reproducing spaces in accordance with customer's preference; thus none of them can establish the correspondence between the color reproducing spaces to an extent with which the customer is satisfied such that the color gamut is maintained in a smooth manner and the initial color appearance and gradation are preserved.

In still another case, Unexamined Published Japanese Patent Application (kokai) No. 7-12283 proposes to establish a correspondence to a different color reproducing space by constructing a model of the color reproducing space using a finite element method, inputting an elastic modulus to generate an elastic deformation. However, it is necessary to input the elastic modulus for each minute area of the finite element and, moreover, to adjust/specify the elastic modulus by the customer; therefore, it is troublesome to perform such adjusting/specifying work and also it is difficult to establish the correspondence to a transformed color.

On the other hand, as the digital technology has advanced, a multi-media which performs transmittance of color image information among a multiple of media, for example, an image on a hardcopy, such as a picture, a printed matter, a copy or the like, an image on a softcopy, such as a television, a monitor or the like, have been developed. In such a multi-media system, color image information processing has been performed by means of a digital color image signal. For example, for the purpose of digital service or the like of the picture, a print image data is in some cases transformed into a monitor image data or the similar data which is subsequently to be outputted. In this case, when a reproduction print is performed using the same image data, the same image is required to be reproduced, namely, a coincidence between the images is required.

However, various image I/O devices as described above have each an individual color space, namely, a reproducible color gamut. Therefore, in order to correctly reproduce by another image I/O device color image data, for example, R (red), G (green), B (blue), C (cyan), M (magenta), Y (yellow) and the like inputted by an image I/O device, it is necessary that color spaces of respective image I/O devices are transformed such that they correspond to each other appropriately, for example, in an appropriate proportion.

Ordinarily, the color gamut of the printer is narrower than that of the display so that, if the customer obtains a satisfactory image after having performed a color adjustment looking at the image represented on the display and then the image data thereof is outputted to the printer without being subjected to any change, an intended output image can not be obtained in some cases.

Moreover, it is necessary to perform a sufficient reproduction also for image data having a color gamut which is wider than that of a picture, such as a CG (computer graphic) image or the like.

Heretofore, various methods have been studied in order to optimally perform such color reproductions. For example, there exists a method which changes color reproduction tables in accordance with image sources. Another method is disclosed in Unexamined Published Japanese Patent Application (kokai) No. 9-135360 in which a plurality of transformations are performed on image data and then results of such plurality of transformations are outputted after having been mixed in accordance with the customer's preference. Moreover, U.S. Pat. No. 5,734,802 discloses a method which has both pictorial and CG image look-up tables, synthesizes these look-up tables after they are weighted in accordance with the color gamut of an input signal to produce a mixed look-up table whereupon input image data having both pictorial and CG image factors are appropriately transformed into output image data.

However, in the above-described conventional color reproducing methods, there exists a problem of coincidence of images when print image data is transformed to monitor image data or the similar image data, then outputted externally and the thus externally outputted image data are transformed back to the print image data, or an inappropriate reproducibility when data of, for example, a CG, a digital camera or the like are processed to be externally outputtable data and then outputted as a print.

For example, in the above-described Unexamined Published Japanese Patent Application (kokai) No. 9-135360, images with different mixing ratios are produced for each customer as a result of a plurality of transformations as described above so that, when these data are returned to a lab shop or the like, there is one problem that these data can not be used. Moreover, in the above-described U.S. Pat. No. 5,734,802, there exists another problem that no consideration has been paid to reversibility from the print image data to the monitor image data.

SUMMARY OF THE INVENTION

The present invention has solved the above-described problems and has a first object of providing a method of compressing/extending a color reproducing space which, when forms or sizes of color reproducing spaces of image I/O devices are different from each other and a correspondence is established between such different color reproducing spaces, is capable of maintaining a color gamut in a smooth manner, establishing a correspondence between image I/O devices which are different in the color reproducing spaces from each other while preserving the initial color appearance or gradation and further easily adjusting the correspondence in accordance with preference.

Moreover, the present invention has a third object of providing a color reproducing apparatus which can embody the color reproducing method according to the present invention.

Moreover, the present invention has a third object of providing a color reproducing apparatus which can embodies the color reproducing method according to the present invention.

In order to attain the first object described above, the first mode of the first aspect of the present invention provides a method of compressing/extending a color reproducing space for transforming a color reproducing space of a first image input/output device into a color reproducing space of a second image input/output device, comprising: a chroma compressing/extending step which compresses or extends chroma of a color gamut of the first image input/output device represent within the same hue plane in a uniform color space in the same hue plane; a lightness correcting step for correcting lightness of the color gamut compressed or extended by the chroma compressing/extending step, the lightness correcting step not executing correction of the lightness when a chroma value is 0, correcting a highest chroma point having a maximal chroma value of the compressed or extended color gamut to a specified point in the color gamut represented in the same hue plane of the color reproducing space of the second image input/output device when the chroma value is the maximal chroma value and correcting the lightness such that a correction amount of the lightness changes in a non-linear manner as the chroma value becomes higher when the chroma value is within a range of from more than 0 to less than the maximal chroma value; and a lightness compressing/extending step of compressing or extending the color gamut which has been processed by the chroma compressing/extending step and the lightness correcting step into within the color gamut of the second image input/output device in the same hue plane.

It is preferable that the method of compressing/extending the color reproducing space further comprises: a color gamut correcting step of correcting an edge form of the color gamut of the second image input/output device in accordance with an edge form of the color gamut of the first image input/output device, before compression or extension to the color reproducing space of the first image input/output device using the method of compressing/extending the color reproducing space is performed. It is also preferable that the method of compressing/extending the color reproducing space further comprises: a non-linear correcting step which corrects a non-linear portion of an edge form of the color gamut of the first image input/output device or the second image input/output device in a linear manner, before compression or extension into the color reproducing space of the first image input/output device using the method of compressing/extending the color reproducing space is performed.

When the color reproducing space is compressed or extended using the method of compressing/extending the color reproducing space, a adjusting parameter of adjusting at least one of a hue, a chroma range and a lightness region for correcting the color reproducing space is preferably provided to adjust at least one of a corresponding hue, a corresponding chroma range and a corresponding lightness region in the color reproducing space to transform into by compression or extension. Preferably, the adjusting parameter which adjusts at least one of the hue, chroma range and lightness region is an adjusting parameter related to at least one of primary colors. Preferably, a color gamut correction parameter to be calculated for correcting the color reproducing space determines a color gamut correction amount to be added to data of a hue of interest by performing an interpolation in accordance with a position of the hue of interest from the adjusting parameter of primary colors located on both sides of the hue of interest on the uniform color space.

It is further preferable that the method of compressing/extending the color reproducing space further comprises: before the method of compressing/extending the color reproducing space in the color reproducing space of the first image input/output device is performed, a white color/black color adjusting step which, when a white point or black point within the color reproducing space of the first image input/output device or the second image input/output device is not located on a lightness axis on the uniform color space, corrects the white point or a range in the neighborhood thereof or the black point or a range in the neighborhood thereof to correct the white point or the black point to be on the lightness axis, a lightness region adjusting step for allowing a lightness region of the color reproducing space of the first image input/output device to be set by the position of points of white color and black color which have been adjusted to be on the lightness axis and a lightness region of the color reproducing space of the second image input/output device to coincide with each other by means of enlargement or contraction; a color gamut correction parameter calculating step which calculates a color gamut correction parameter in accordance with the color gamut the edge form of which is corrected and the resultant corrected edge form of which is set by the color gamut correcting step or the non-linear correcting step; and a color reproducing space calculating step which determines a corrected color gamut for each hue using the color gamut correction parameter calculated in the color gamut correction parameter calculating step and allows the thus determined, corrected color gamut to be the color reproducing space of the first image input/output device which is to be subjected to compression or extension of the color reproducing space, or the color reproducing space of the second image input/output device to compress or extend the color reproducing space into.

It is still further preferable that the color gamut correcting step corrects the edge form of the color gamut of the second image input/output device by allowing a hue of at least one of primary colors in the color gamut of the second image input/output device to coincide with a hue of at least one of the primary colors in the color gamut of the first image input/output device, and when a lightness change relative to a chroma change of the edge form on the color gamut of the first image input/output device or the second image input/output device is non-linear, the non-linear correcting step corrects the lightness change relative to the chroma change of the edge form on the color gamut in a linear manner within the same hue plane in the uniform color space.

Preferably, the lightness compressing/extending step performs a non-linear compression or extension such that a ratio of compression or extension is larger in the neighborhood of an edge of the color gamut to be compressed or extended while the ratio of compression or extension is smaller as a point in the color gamut to be compressed or extended is apart from the neighborhood of the edge. When compression or extension is performed keeping the chroma value to be constant in the color gamut to be compressed or extended, a ratio of compression or extension is preferably fixed as 0 at a middle point having a middle lightness value between a maximal lightness value and a minimal lightness value at a specified chroma value and a ratio of compression or extension is larger as a point is apart from the middle point and when the ratio of the compression or extension surpasses a maximal compression or extension ratio which have been previously set, a point to which the middle point is moved by compressing or extending the middle point is preferably moved such that the point is contained within the maximal compression ratio and the maximal extension ratio. When the compression or extension ratio still surpasses the maximal compression or extension ratio which has been previously set even after the middle point is moved by transformation, a point having a middle value between the maximal lightness value and the minimal lightness value at the same chroma value in the color gamut of the second image input/output device as that of the middle point in the color gamut of the first image input/output device is preferably set as a fixed point and then compression or extension is preferably performed such that the compression/extension ratio is 0 at the fixed point, increases as a point is apart from the fixed point and becomes the maximal compression ratio or the maximal extension ratio at the maximal lightness value and the minimal lightness value and, thereafter, compression or extension is performed in a linear manner.

It is preferable that the method of compressing/extending the color reproducing space of the first mode further comprises the steps of: predetermining a common region highest chroma point having a maximal chroma value within the same hue plane in a common region of color gamuts of the first image input/output device and the second image input/output device, before the chroma compressing/extending step is performed; performing compression or extension in which the chroma value at the highest chroma point of the color gamut to be compressed or extended becomes the chroma value of the common region maximal chroma point with respect to the color gamut in the chroma compressing/extending step; thereafter, performing the correction of lightness value which allows the highest chroma point of the color gamut in which compression or extension of the chroma has been transformed to coincide with the common region highest chroma point, in the lightness correcting step; and thereafter, compressing or extending the color gamut which has been corrected in the lightness correcting step to transform it into the common region of the color gamut of the first image input/output device and the second image input/output device thereby performing the method of compressing/extending the color reproducing space for each hue plane, in the lightness compressing/extending step.

It is also preferable that the method of compressing/extending the color reproducing space of the first mode further comprises the steps of: determining a chroma value $C_1$ on an edge of the color gamut of the second image input/output device having a same lightness value as that of the highest chroma point of the color gamut of the first image input/output device in the same hue plane on the uniform color space, before the chroma compressing/extending step is performed; determining a chroma value $C_2$ of a common region highest chroma point having the maximal chroma value in the common region of the color gamuts of the first image input/output device and the second image input/output device in the same hue plane; determining a chroma value $C_3$ of the highest chroma point of the color gamut of the second image input/output device in the same hue plane; setting the adjusting parameter for adjusting a chroma range in which a range between the chroma value $C_1$ and the chroma value $C_3$ is a maximal adjustable range with the chroma value $C_2$ being in the center among the thus determined chroma values; determining a chroma value by interpolation from the chroma value $C_1$, chroma value $C_2$ and chroma value $C_3$ using the thus determined adjusting parameter, determining a point nearer to the lightness value of the highest chroma point on the edge of the color gamut of the second image input/output device having the thus determined chroma value and then setting the thus determined point as a corrected highest chroma point; performing, in the chroma compressing/extending step, compression or extension in which the chroma value of the highest chroma point of the color gamut to be compressed or extended is the chroma value of the corrected highest chroma point on the color gamut of the first image input/output device; and thereafter, performing, in the lightness correcting step, the lightness correction which allows the lightness value of the highest chroma point of the color gamut to coincide with the lightness value of the corrected highest chroma point on the color gamut in which chroma has been compressed or extended to be transformed.

Preferably, the lightness compressing/extending step further comprises the stages of: determining the color gamut belonging to both of the common region of color gamut of the first image input/output device and the color gamut of the second image input/output device in the same hue plane on the uniform color space and the color gamut in which lightness correction has been performed in the lightness correcting step as a coincidence emphasis region; determining the color gamut obtained by replacing a portion of the edge within the color gamut of the second image input/output device with a curve which is present outside the coincidence emphasis region and inside the color gamut of the second image input/output device, curves in the color gamut of the second image input/output device in a non-linear manner as the chroma value becomes larger starting from 0 and reaches the corrected highest chroma point at the chroma value of the corrected highest chroma point as a color gamut emphasis region; obtaining a corrected lightness region for each hue plane by interpolation from the adjusting parameter which adjust a set lightness region using the thus determined color gamut emphasis region and the coincidence emphasis region; and thereafter, compressing or extending in the lightness compressing/extending step, the color gamut which has been corrected in the lightness correcting step and transformed into the corrected lightness region thereby performing the method of compressing/extending the color reproducing space for each hue space.

Preferably, a transformation of compression or extension to be performed in the chroma compressing/extending step or the lightness compressing/extending step is a transformation represented in the following equation as a standardized value of from 0 to 1 before the transformation is denoted by X; a standardized value of from 0 to 1 after the transformation is denoted by F:

$$F=(k-1)\cdot X^2 + X \qquad (1)$$

wherein k denotes compression/extension ratio.

The second mode of the first aspect of the present invention provides a method of compressing/extending a color reproducing space, comprising the step of: before the color reproducing space is compressed or extended such that the color reproducing space of a first image input/output device is transformed into the color reproducing space of a second image input/output device having a different shape or size of the color reproducing space, correcting an edge shape of a color gamut of the second image input/output device in accordance with an edge shape of a color gamut of the first image input/output device.

The third mode of the first aspect of the present invention provides a method of compressing/extending a color reproducing space comprising the step of: before the color reproducing space is compressed or extended such that the color reproducing space of a first image input/output device is transformed into the color reproducing space of a second image input/output device having a different shape or size of the color reproducing space, correcting a non-linear portion of an edge shape of a color gamut of the first image input/output device or the second image input/output device in a linear manner.

The fourth mode of the first aspect of the present invention provides a method of compressing/extending a color reproducing space, comprising the steps of: when the color reproducing space is compressed or extended such that the color reproducing space of a first image input/output device is transformed into the color reproducing space of a second image input/output device having a different shape or size of the color reproducing space, providing an adjusting parameter of adjusting at least one of a hue, a chroma range and a lightness region for the purpose of adjusting the color reproducing space; and then adjusting at least one of corresponding a hue, the chroma range and the lightness region of the color reproducing space to transform into by compression or extension.

The fifth mode of the first aspect of the present invention provides a method of compressing/extending a color reproducing space in which, when the color reproducing space is compressed or extended such that the color reproducing space of a first image input/output device is transformed into the color reproducing space of a second image input/output device having a different shape or size of the color reproducing space, comprising the step of: preliminarily determining a coincidence emphasis region in which magnitude relationship of lightness values or chroma values before and after such compression or extension is maintained and image gradations or color appearances before and after such compression or extension coincide with each other, even if the color gamut of the first image input/output device is compressed or extended in the same hue plane, and a color gamut emphasis region that contains the coincidence emphasis region, is contained in the color gamut of the second image input/output device and has the color gamut to be outputted by the second image output/input device being larger than the coincidence emphasis region; determining the color gamut by interpolation using the thus determined coincidence emphasis region and color gamut emphasis region in accordance with intensities of emphases thereof as a color gamut to transform into; and whereby performing compression or extension.

In order to attain the second object described above, the second aspect of the present invention provides a color reproducing method for producing a transformation table for use in a plurality of image input/output devices having different color gamuts, comprising: a first step of producing a database A representing transformation that uses input image data to a first image input/output device as an input, transforms the input into a reproducing color of the first image input/output device and uses the thus transformed reproducing color as an output; a second step of producing a database B representing transformation that uses input image data to a second image input/output device as an input, transforms the input into a reproducing color of the second image input/output device and uses the thus transformed reproducing color as an output; a third step of producing a database AB by transforming a color gamut of the first image input/output device represented by the database A into within a color gamut of the second image input/output device represented by the database B such that gradation is preserved; a fourth step of producing a database BA by transforming a color gamut of the second image input/output device represented by the database B into within a color gamut of the first image input/output device represented by the database A such that gradation is preserved; a fifth step of producing a database $BA^{-1}$ in the database B by determining inverse transformation of the transformation from the database B to the database A by an inverse operation and then providing resultant inverse transformation to the color gamut of the first image input/output device represented by the database A; and a sixth step of producing a color reproduction target database N for performing transformation from the database A to the database B by mixing color gamuts with respect to the second image input/output device represented by the database AB the database $BA^{-1}$ in a linear manner.

It is preferable that, when the database $BA^{-1}$ is produced in the fifth step, by taking the output of the database A determined in the first step as the output of the database BA, an input of the database BA with respect to the output is determined from transformation in the fourth step by an inverse operation; an output of the database B relative to the database BA is determined; and the input of the database A and the database $BA^{-1}$ is produced by allowing the input of the database A to correspond to the output of the database B.

Preferably, the each transformation includes light source transformation and light range adjustment.

Preferably, a transformation table ab for transformation from the color gamut of the first image input/output device to the color gamut of the second image input/output device is produced from the color reproduction target database N.

Preferably, a transformation table $ab^{-1}$ for transformation from the color gamut of the second image input/output device to the color gamut of the first image input/output device is produced from the transformation table ab by the inverse operation.

Preferably, the each inverse operation is executed by an iterative search method.

In order to attain the third object described above, the third aspect of the present invention provides a color reproducing device for producing a transformation table for use in a plurality of image input/output devices having different color gamut, comprising: a device for producing a database A representing transformation in which input image data to a first image input/output device is taken as an input, the input is transformed into a reproducing color of the first image input/output device and a consequence of such transformation is taken as an output; a device for producing a database B representing transformation which takes an input image data to a second image input/output device as an input, transforms the input into a reproducing color of the first image input/output device and takes a consequence of such transformation as an output; a device for producing a database AB by transforming the color gamut of the first image input/output device represented by the database A into within the color gamut of the second image input/output device represented by the database B such that the initial gradation is preserved; a device for producing a database BA by transforming the color gamut of the second image input/output device represented by the database B into inside the color gamut of the first image input/output device represented by the database A such that the initial gradation is preserved; a device for producing a database $BA^{-1}$ in the database B by determining an inverse transformation of the transformation from the database B into the database A by an inverse operation and then providing the thus determined inverse transformation to the color gamut of the first image input/output device represented by the database A; and a device for producing a color reproduction target database N for transforming the database A into the database B by mixing the color gamut with respect to the second image input/output device represented by the database AB and the database $BA^{-1}$.

BRIEF DESCRIPTION OF THE DRAWINGS

FIGS. 9A to 9E each illustrate an embodiment of compression/extension processing in the method of compressing/extending a color reproducing space according to the present invention;

DETAILED DESCRIPTION OF THE INVENTION

We will now describe more specifically a method of compressing/extending a color reproducing space according to a first embodiment of the present inventions a color reproducing method and a color reproducing apparatus according to a second and a third embodiments of the present invention respectively, with reference to the preferred embodiments shown in the accompanying drawings.

To begin with, the method of compressing/extending a color reproducing space according to the first embodiment of the present invention is described, based on the image processing apparatus implementing the method of compressing/extending the color reproducing space of the present invention, with reference to FIGS. 1 to 12.

Figure 1:
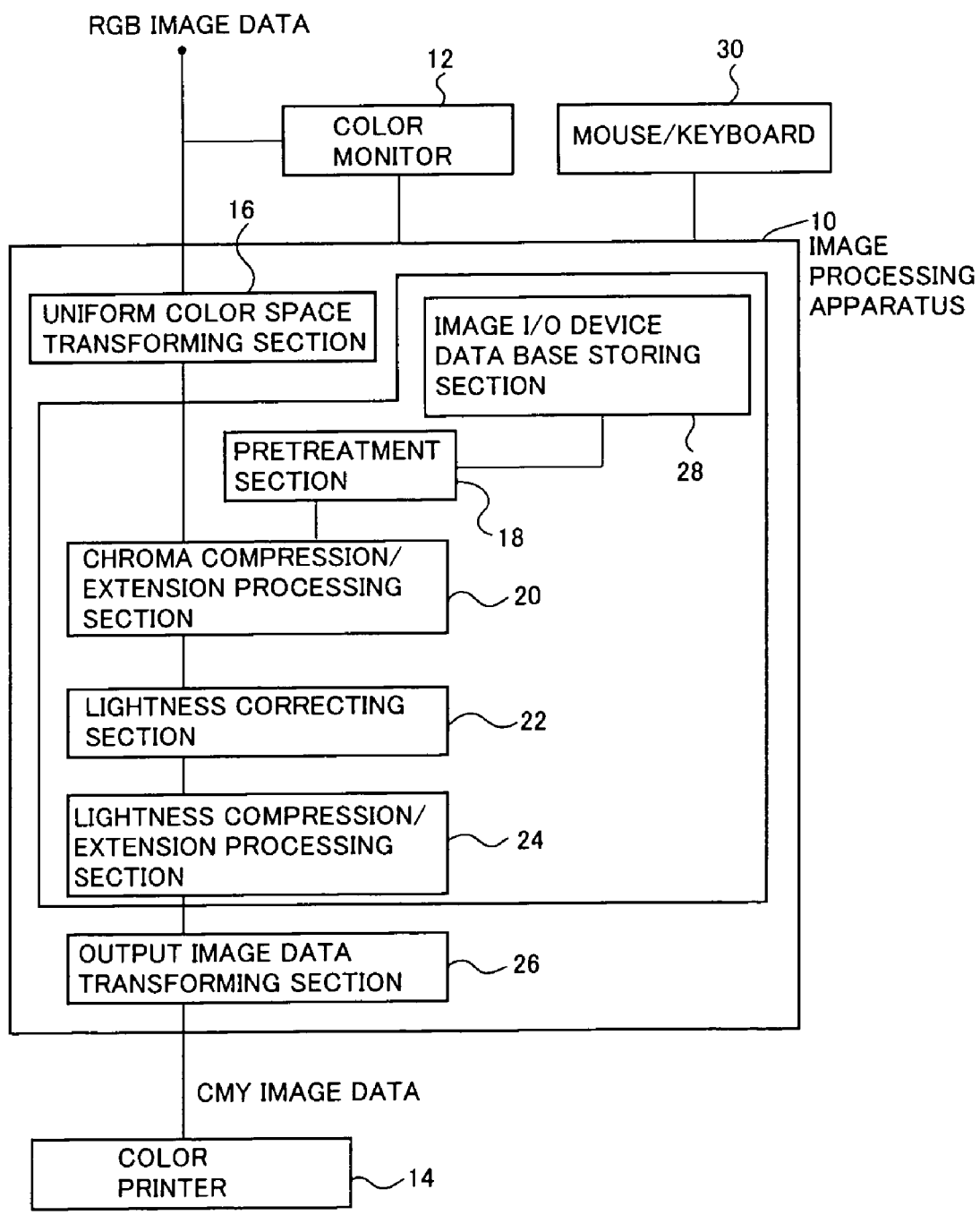
FIG. 1 is a block diagram showing an embodiment of an image processing apparatus performing a method of compressing/extending a color reproducing space according to the present invention.

FIG. 1 shows an image processing apparatus 10 implementing a method of compressing/extending a color reproducing space of the present invention. The image processing apparatus 10 is not only an image processing apparatus into which RGB image data that have been read with a scanner or the like, subjected to various processing such as lightness correction, contrast correction, edge enhancement processing and the like and allowed to be outputted to a color monitor 12 are inputted and from which CMY image data that are adapted to a color printer 14 are outputted, but also an image processing apparatus which determines transformation processing to be performed on RGB image data using the method of compressing/extending the color reproducing space of the present invention so as to obtain CMY image data to be outputted to the color printer 14 from the RGB image data.

The image processing apparatus 10 as described above is composed of a uniform color space transforming section 16, a pretreatment section 18, a chroma compression/extension processing section 20, a lightness correcting section 22, a lightness compression/extension section 24, an output image data transforming section 26 and an image input/output device database storing section (hereinafter referred to as "image I/O device database storing section") 28.

Besides these sections, the image processing apparatus 10 is provided with a mouse/keyboard 30 for inputting an adjustment parameter or the like for transformation of compressing/extending the color reproducing space. Though not shown in FIG. 1, also provided to the image processing apparatus 10 are a CPU for controlling an overall operation of the image processing apparatus 10 and a memory necessary for performing image processing.

The color monitor 12 not only represents an image from RGB image data but also is connected to the image processing apparatus 10 and then used for a customer to input various adjustment parameters or the like with the mouse/keyboard 30 while observing a picture with the image represented thereon.

The uniform color space transforming section 16 transforms RGB image data into tristimulus value XYZ color matching system in accordance with an equation (2) described below and the thus transformed tristimulus values (X, Y and Z) are transformed into psychometric lightness v and perceived psychometric chromaticities a*b* (hue and chroma) in CIEL*a*b* color matching system in accordance with equations (3) to (5) described below.

$$\begin{pmatrix} X \\ Y \\ Z \end{pmatrix} = \begin{bmatrix} X_r & X_g & X_b \\ Y_r & Y_g & Y_b \\ Z_r & Z_g & Z_b \end{bmatrix} \begin{pmatrix} R \\ G \\ B \end{pmatrix}$$

wherein (Xr, Yr, Zr), (Xg, Yg, Zg) and (Xb, Yb, Zb) represent tristimulus values in the XYZ color matching system of primary colors R, G and B whereas (R, G, B) represents a stimulus value of RGB image data in the RGB color matching system.

$$v = 116(Y/Y_n)^{(1/3)} - 16 \qquad (3)$$

$$a^* = 500\{(X/X_n)^{(1/3)} - (Y/Y_n)^{(1/3)}\} \qquad (4)$$

$$b^* = 200\{(Y/Y_n)^{(1/3)} - (Z/Z_n)^{(1/3)}\} \qquad (5)$$

wherein $X_n$, $Y_n$ and $Z_n$ are tristimulus values which are taken as reference.

The values of v, a* and b* thus obtained by the equations (3) to (5) are sent to the chroma compression/extension processing section 20.

The pretreatment section 18 is a site for preliminarily performing pretreatment of modification or correction on forms of the color reproducing space before and after the transformation thereof so as to determine the transformation processing to be performed on the RGB image data;

when a point of white color or black color in the color reproducing space of the color monitor 12 or the color printer 14 is not present on a lightness axis on the uniform color space, namely, when none of a* and b* values of the point of white color or black color are 0, the processing method of the pretreatment described above is composed of a white/black color adjusting step (HL/SD adjusting step) which corrects points of white and black colors to allow them to be on the above-described lightness axis by subjecting the point of white color and a range in the neighborhood of the white color (HL range) or the point of black color and a range in the neighborhood of the black color (SD range) to correction by means of transformation;

a lightness region adjusting step which extends or compresses the lightness region of the color reproducing space of the color monitor 12 or the color printer 14 which is specified by the points of white and black colors on the lightness axis to allow both ranges to coincide with each other;

a color gamut correcting step which corrects the form of the color reproducing space of the color monitor 12 or the color printer 14;

a color gamut correction parameter calculating step which calculates a color gamut correction parameter of the whole color reproducing space in accordance with the thus corrected color gamut; and a color reproducing space calculating step which determines a color gamut corrected for each hue using the thus calculated color gamut correction parameter produced in the above-described color gamut correction parameter calculating step. These various types of steps will be described in detail below.

Figure 2:
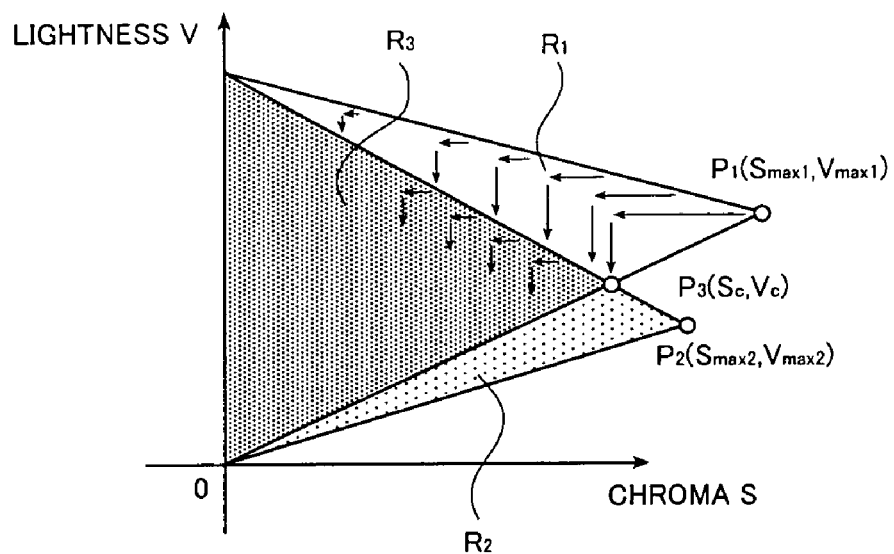
FIG. 2 illustrates an embodiment of the method of compressing/extending a color reproducing space according to the present invention.
Figure 3:
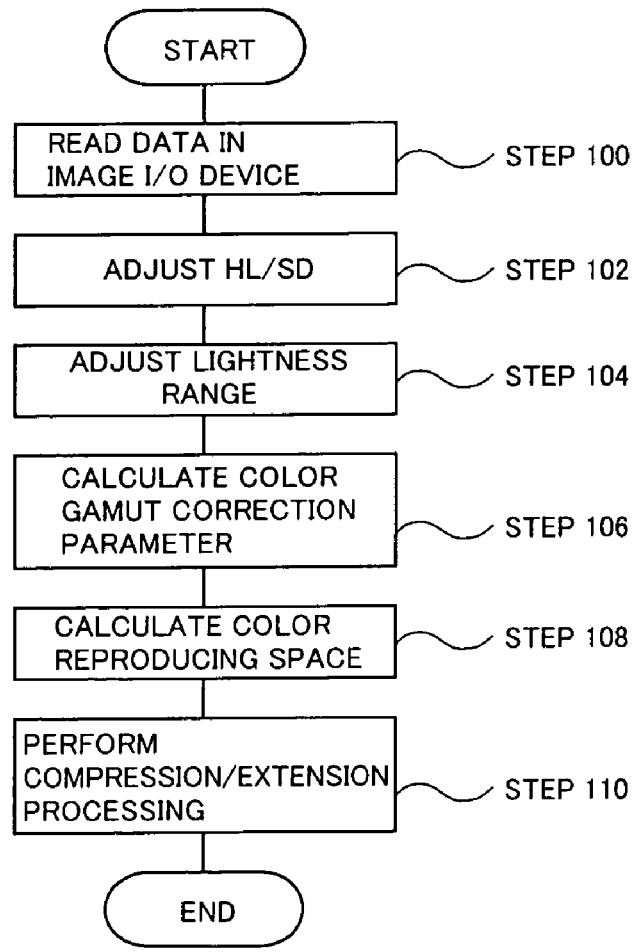
FIG. 3 is a flowchart showing an embodiment of a method of compressing/extending a color reproducing space according to the present invention.

FIG. 2 shows color reproducing spaces of color monitor 12 and color printer 14 on a hue plane on a uniform color space which is shown by v (L* is hereinafter referred to as "v"), a* and b* of CIEL*a*b* color matching system; in the figure, the color gamuts of the color monitor 12 and the color printer 14 are shown by the color gamuts $R_1$ and $R_2$, respectively, and moreover chroma s of the horizontal axis is shown by $(a^{*2}+b^{*2})^{(1/2)}$. As shown in FIG. 2, the chroma compression/extension processing section 20 is a processing section which compresses the color gamut $R_1$ in a direction of chroma s such that a maximal chroma value $S_{max1}$ of the color gamut $R_1$ of the color monitor 12 comes to be a chroma value $S_c$ of a common region highest chroma point $P_3$ of a common region $R_3$ of the color gamuts $R_1$ and $R_2$ on the hue plane. In the present embodiment, compression is necessarily performed for transformation into the common region $R_3$ of the color gamuts $R_1$ and $R_2$; however, the present invention is not limited to this type and enlargement transformation may be performed such that extension into within the color gamut $R_2$ of the color printer 14 is executed by using a compression/enlargement equation which will be described below and adjusting a compression/extension ratio k, in accordance with the color gamut $R_2$ of the color printer 14.

The lightness correcting section 22 is a section which corrects lightness of a color gamut $R_1'$ obtained by compressing the color gamut $R_1$ in the chroma compression/extension processing section 20 on the same hue plane. Such a lightness value correction to be performed in the same hue plane does not execute correction, when the chroma value is 0, and corrects the highest chroma point of the color gamut $R_1'$ to the common region highest chroma point $P_3$ which is the highest chroma point of the common region $R_3$ of the color gamuts $R_1$ and $R_2$ such that a lightness correction, amount changes in a non-linear manner as the chroma value becomes higher, when the chroma value is between more than 0 and the chroma value $S_c$ of the common region highest chroma point $P_3$. The lightness value of color gamut $R_1'$ obtained by compressing the color gamut $R_1$ is corrected in such a way as described above to obtain a color gamut $R_1''$ in which the highest chroma point $P_1$ coincides with the common region highest chroma point $P_3$ of the common region $R_3$.

The lightness compression/extension processing section 24 is a section which compresses or extends the color gamut $R_1''$ in a direction of lightness v so that it is transformed to be present within the common region $R_3$ of the color gamuts $R_1$ and $R_2$. This compression extension is performed because the color gamut $R_1''$ is not necessarily contained within the common region $R_3$ f the color gamuts $R_1$ and $R_2$ and, as a result, is not necessarily contained in the color gamut $R_2$. The compression/enlargement is performed using a compression/enlargement transformation equation to be described below whereupon enlargement or extension can be performed by adjusting the compression/extension ratio k.

The output image data transforming section 26 is a section which transforms image data represented by the psychometric lightness v and perceived psychometric chromaticities a* and b* that have been transformed to be within the color reproducing space of the color printer 14 in the image processing apparatus 10 into CMY image data which is to be set in accordance with output characteristics of the color printer 14.

Namely, the initial image data is transformed into the tristimulus value XYZ color matching system in accordance with equations (3) to (5) and, then, into the CMY image data by the known method.

The image I/O device database storing section 28 is a section which stores data of the color reproducing space to be set in accordance with the type or the like of the color monitor 12 or the color printer 14; such data are used for setting the method of compressing/extending the color reproducing space according to the present invention; thus, for this purpose, the customer inputs the type or other information of the color monitor 12 or the color printer 14 via mouse/keyboard 30 whereupon the data of the color reproducing space can be retrieved from the image I/O device database storing section 28 and then sent to the pretreatment section 18.

Once the method of compressing/extending the color reproducing space is set in accordance with the type of the color monitor 12 or the color printer 14, the image processing apparatus 10 may construct a look-up table (LUT) having a multiplicity of data sets which transform RGB image data to CMY image data and then transform the RGB image data to the CMY image data as one lot using the thus constructed look-up table.

Next, the method of compressing/extending the color reproducing space according to the present invention will be described in the order of processing operations which are executed in the image processing apparatus 10.

The image processing apparatus 10 has a function which sets transformation of compression/extension on the uniform color space to be performed on the RGB image data in accordance with the method of compressing/extending the color reproducing space according to the present invention so as to transform RGB image data such that the RGB image data can be adapted to the color reproducing space of the color printer 14.

First of all, as shown in FIG. 1, types of the color monitor 12 and the color printer 14 are inputted with the mouse/keyboard 30, data of the input/output devices, namely, the color monitor 12 and color printer 14, are read from the image I/O device database storing section 28 to obtain data of the color reproducing space (step 100).

Figure 4A:
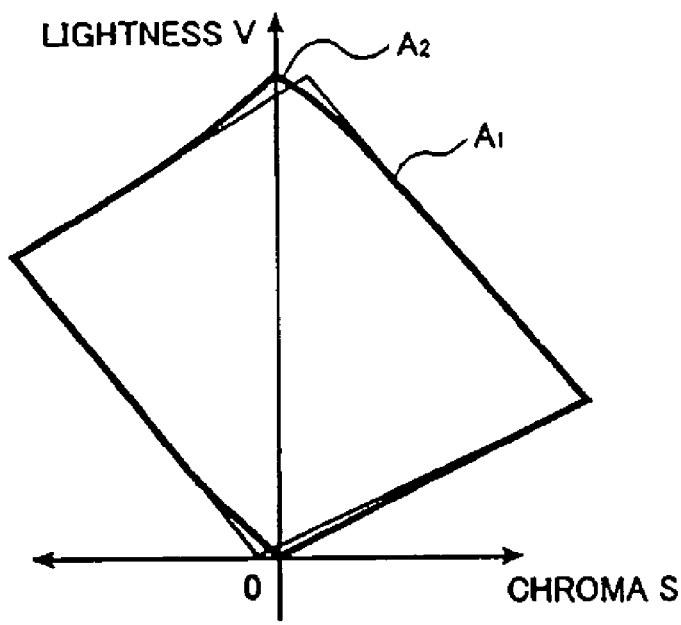
FIG. 4A illustrates an embodiment of HL/SD adjustment in the method of compressing/extending a color reproducing space according to the present invention.

The thus obtained data of the color reproducing space is represented on the color monitor 14 and, for example, as shown in FIG. 4A, is represented on a hue on the uniform color space.

Firstly, as shown in FIG. 4A, when a point of white color (a point which has a maximal value of lightness v) or a point of black color (a point which has a minimal value of lightness v) in the color reproducing space is not present on the lightness axis v, the point of white color and a range in the neighborhood of the white color (HL range) or the point of black color and a range in the neighborhood of the black color (SD range) are adjusted by performing a white color/black color adjustment (HL/SD adjustment) so as to allow the point of white color or black color to be present on the lightness axis v (step 102). The white color/black color adjustment may correct an edge form of the color gamut from a form $A_1$ to a form $A_2$ in a smooth manner using the mouse/keyboard 30 on the represented picture or may be performed by an operation using a function or the like.

Figure 4B:
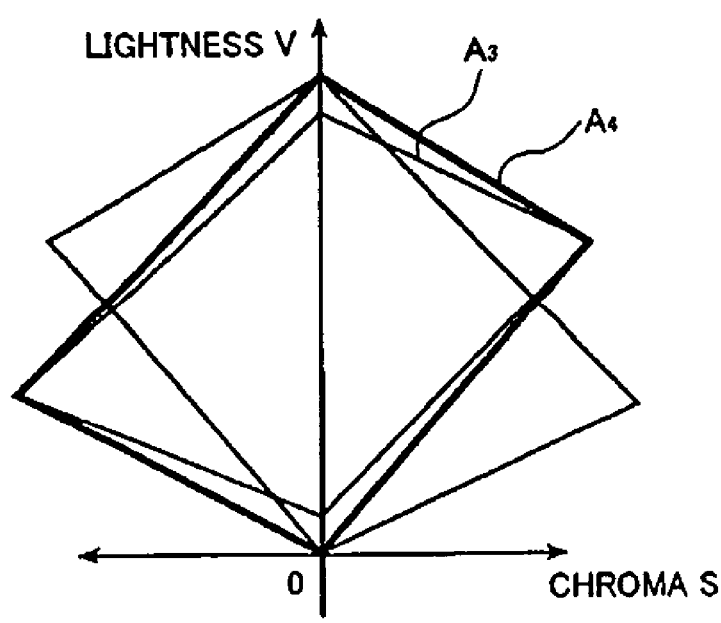
FIG. 4B illustrates an embodiment of lightness region adjustment in the method of compressing/extending a color reproducing space according to the present invention.

Secondly, a lightness region of the color reproducing space which has been subjected to the white color/black color adjustment is adjusted by performing enlargement or contraction such that the lightness regions of the color reproducing spaces of the color monitor 12 and the color printer 14 coincide with each other (step 104). The adjustment of the lightness region preliminarily subtracts the minimal lightness value from the color reproducing space, performs a color transformation making use of a method of von Kries used in chromatic adaptation transformation or the like and then adds a minimal chroma value of the color reproducing space to which the initial data is to be transforme. Namely, the lightness values of the white color and black color of the color reproducing color space of the color monitor 12 are allowed to coincide with the maximal lightness values of the color reproducing space of the color printer 14; in a reverse way, lightness values of white color and black color of the reproducing color space of the color printer 14 are allowed to coincide with the maximal lightness value of the reproducing color space of the color monitor 12. As shown in FIG. 4B, the edge form of the color gamut is adjusted from a form $A_3$ to a form $A_1$. A reason why such corrections of white and black colors are performed is because it is not appropriate that the white color or black color which does not inherently have chroma has a chroma value. Moreover, a reason why the lightness regions are coordinated is because compression or extension of the color reproducing space which will be described below can easily be performed.

As a next step, data of the color gamut of the color monitor 12 or the color printer 14 is subjected to the color gamut correction to calculate a color gamut correction parameter corresponding to the correction of the color gamut (step 106).

The color gamut correction comprises a color gamut correction and a non-linear correction to be performed on the edge form of the color gamut.

Figure 5A:
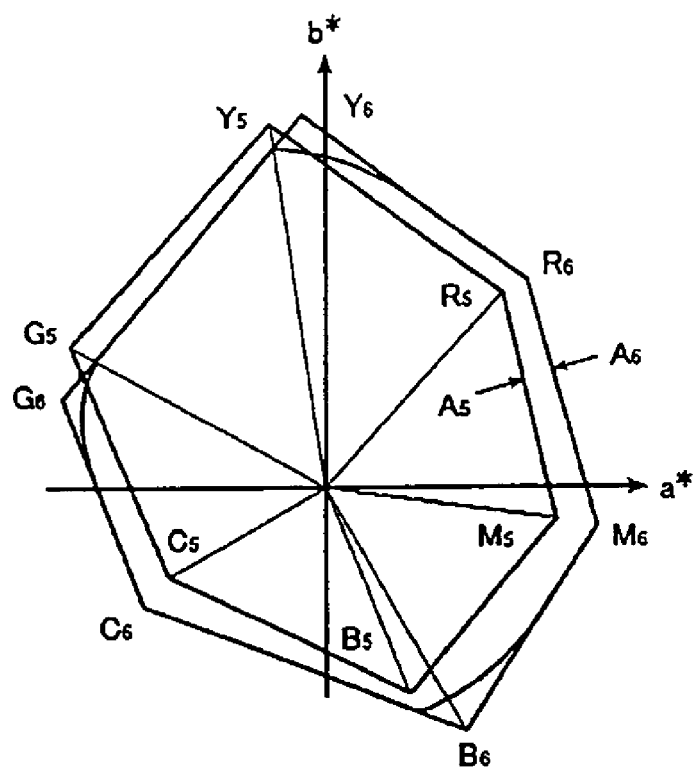
FIGS. 5A and 5B each illustrate an embodiment of color gamut correction in the method of compressing/extending a color reproducing space according to the present invention.

The color gamut correction will now be described. Chromaticity diagrams of color reproducing spaces of the color monitor 12 and the color printer 14 are conveniently shown in FIG. 5A. As shown in FIG. 5A, an edge form $A_5$ of the color gamut of the color monitor 12 and an edge form $A_6$ of the color gamut of the color printer 14 do not coincide with each other. In FIG. 5A, for example, the primary color B (blue) is located at a point $B_5$ in the color monitor 12 while it is located at a point $B_6$ for the color printer 14; hence, the hue value h, that is, hue angle $\tan^{-1} (b^*/a^*)$ thereof is different. As in the same way, the primary color Y (yellow) is located at a point $Y_5$ and a point $Y_6$ in the color monitor 12 and the color printer 14, respectively; further, the primary color G (green) is located at a point $G_5$ and at a point $G_6$ in the color monitor 12 and the color printer 14, respectively; hence, hue angle thereof in each primary color is different, that is, the hue in each primary color is different.

If compression/extension of color reproducing space is performed while leaving such offsets of primary colors as they are, then, for example, in the case of image data of gradation using an edge portion of the color reproducing -space of the color monitor 12, the transformed image data is represented in colors in accordance with the form $A_5$ of the color gamut of the color printer 14, that is, is inflected at the point $B_5$, $Y_5$ or $G_5$ whereupon the gradation in which a color inherently changes smoothly can not be obtained. Therefore, in order to maintain the hue of the inputted image data, the form of the color gamut of the color printer 14 is preliminarily corrected in accordance with the form of the color gamut of the color reproducing space of the color monitor 12. In other words, as shown in FIG. 5A, the neighborhood of the point $B_6$ is corrected so as to be smooth with a curve such that the edge form $A_6$ of the color gamut of the color printer 14 has a bend with a hue angle of the point $B_5$. The neighborhood of each of points $Y_6$ and $G_6$ is also corrected so as to be smooth with a curve or the like.

Figure 5B:
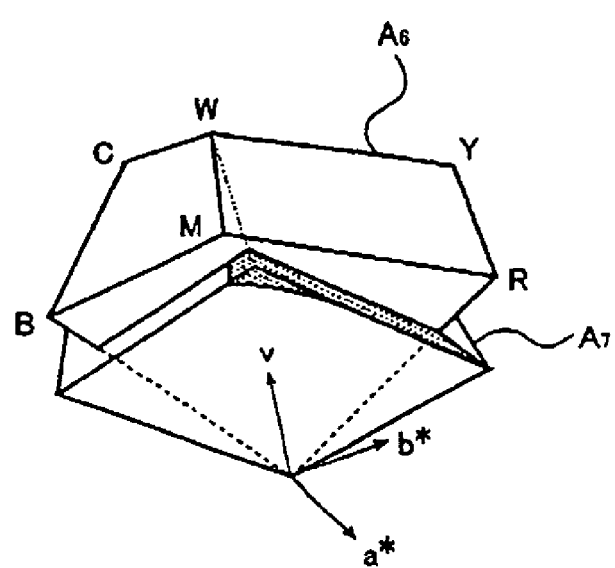

FIG. 5A is a chromaticity diagram showing a state when a bend is corrected by adjusting chroma; such a correction is performed three dimensionally with a lightness component being also corrected. FIG. 5B, which illustrates a different embodiment from the one illustrated in FIG. 5A, shows a color reproducing space seen in a vertical direction relative to a lightness axis v and further shows a space form $A_6$ of the color reproducing space of the color monitor 12 and a space form $A_7$ of the color reproducing space of the color printer 14 thereby showing that a lightness component of the space form $A_7$ is corrected by correcting the hue of the primary color M (correction to a black portion).

In this case, a correction has been made on the black portion in the figure so that line segments WRYM connecting points W, R, Y and M on the space form $A_6$ in which a continuous gradation is inherently obtained may not be bent in accordance with the form of hue of the space form $A_7$ located under the space form $A_6$.

Figures 7, 8:
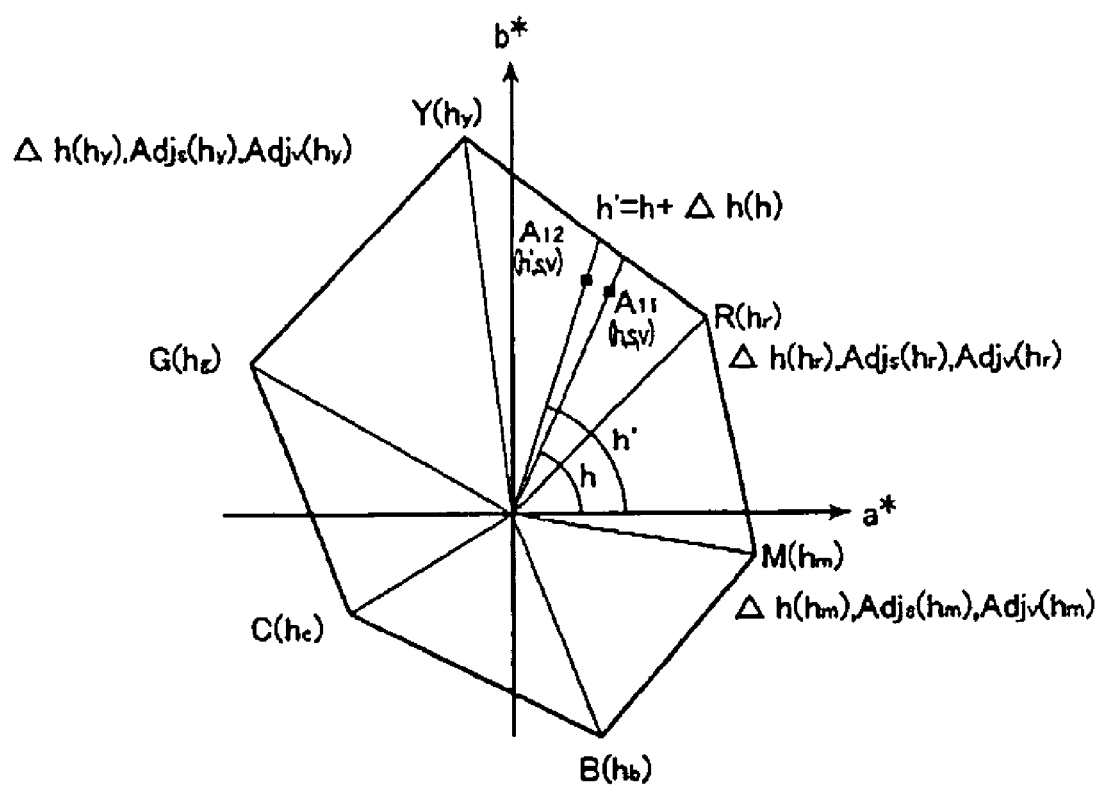
FIG. 7 illustrates an correction method of color gamut correction in the method of compressing/extending a color reproducing space according to the present invention.
FIG. 8 illustrates an adjustment parameter in the method of compressing/extending a color reproducing space according to the present invention.

A color gamut correction parameter in relation to a hue except a primary color, for example, the color gamut correction parameter of a point $A_{11}$ of interest having hue value h, chroma value s and lightness value v as shown in FIG. 7, can be calculated by means of interpolation using respective adjustment amounts $\Delta h$ (hr) and $\Delta$(hy) of hue values of points of primary colors R and Y which are located on opposite sides of the point $A_{11}$ of interest. When the color gamut is calculated, the thus calculated color gamut correction parameter is added to the hue value h of the point $A_{11}$ of interest to produce a corrected point, namely, a point $A_{12}$ having the hue value of h'. The color gamut correction parameter is calculated with respect to the whole color reproducing space on a hue plane for each color gamut.

As shown in FIG. 8, an adjustment parameter which sets adjustment amounts of the primary colors R, G, B, C, M and Y that are bases for calculating the color gamut correction parameter is set by a value in each column of the hue adjustment parameter Adjh standardized in relation to hue.

The value can be inputted via the mouse/keyboard 30 and, moreover, correction of the form may directly be performed on the color gamut using the mouse/keyboard 30 with respect to the color gamut represented on the color monitor 12. If the correction is performed looking at the represented picture as described above, as shown in FIG. 8, the value in each column of the hue adjustment parameter Adjh can automatically be obtained. In the table shown in FIG. 8, chroma range adjustment parameter Adjs and lightness region adjustment parameter Adjv are shown; these will be described below.

In the correction method as described above, an interpolation is three-dimensionally performed using the adjustment amounts of primary colors of R, G, B, C, M and Y.

In the present embodiment, the correction method described above is utilized for pretreatment of compression/extension processing of the color reproducing space which will be described below; however, the present invention is not limited to such correction method and any known method which has been used for pretreatment of compression/extension processing of the color reproducing space may be permissible.

Figure 6:
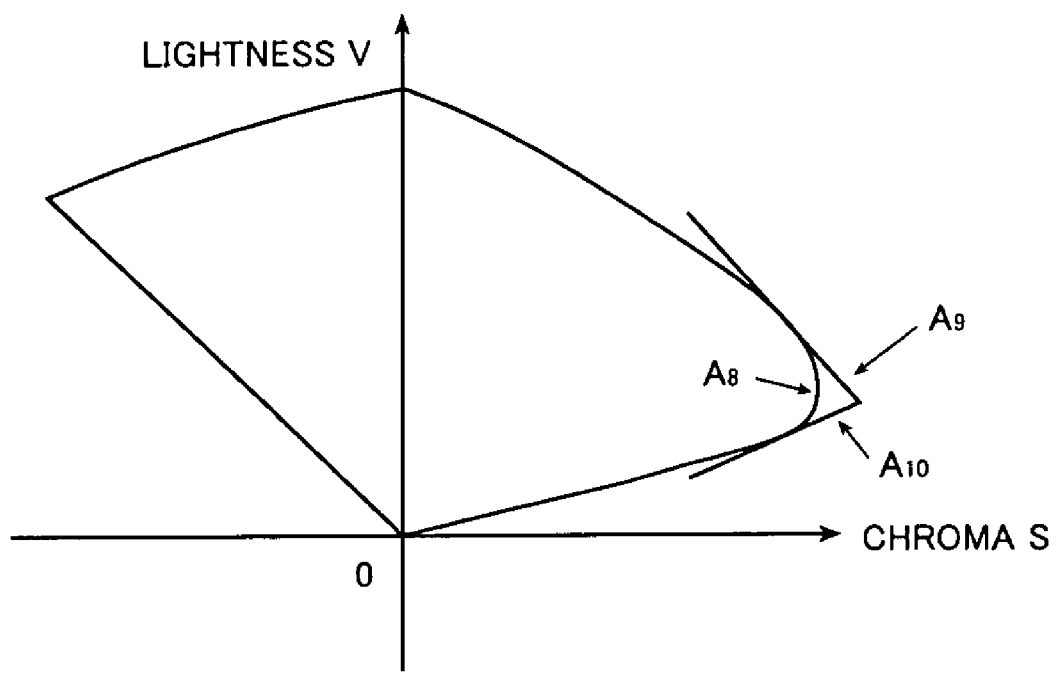
FIG. 6 illustrates another embodiment of color gamut correction in the method of compressing/extending a color reproducing space according to the present invention.

As a hue plane of a color reproducing space is shown in FIG. 6, the neighborhood of a highest chroma point becomes in many cases dull and thus roundish in a non-linear manner in the neighborhood of a point having a maximal chroma value due to characteristics of devices so that it becomes difficult to satisfactorily determine an optimal chroma point. To solve this problem, as shown in FIG. 6, a non-linear correction of the edge form of the color gamut is performed such that a color gamut is set by replacing the non-linear portion $A_8$ with a direct line $A_9$ or $A_{10}$ to clearly define a highest chroma point. The non-linear correction described above can be performed on any color reproducing space of the color monitor 12 and the color printer 14. Moreover, such a correction is not necessarily performed on the roundish portion with a non-linear form, but may appropriately be performed on the neighborhood of the highest chroma point in accordance with the customer's command, so long as the highest chroma point is clearly defined.

Interpolation is performed on the basis of the hue plane which has been adjusted by the non-linear correction to calculate the color gamut correction parameter of the whole color reproducing space.

Moreover, in the present embodiment, the above-described non-linear correction is utilized as the pretreatment of the compression/extension processing of the color reproducing space to be described below; however, the present embodiment is not the sole case and any conventional correction which has been utilized as the pretreatment of the compression/extension processing of the color reproducing space may of course be used.

Next, a corrected color gamut is determined for each hue plane using the thus obtained color gamut correction parameter or correction parameter for the non-linear correction is determined and then the color reproducing space is calculated (step 108) thereby obtaining the color reproducing space of the color monitor 12 which is the target of the compression/extension of color reproducing space or of the color printer 14 for which the compression/extension of color reproducing space is performed.

In such a manner as described above, the color reproducing space is set in the pretreatment section 18 of the image processing apparatus 10.

Next, the compression/extension processing of the color reproducing space of the color monitor 12 is performed (step 110).

The compression/extension processing is composed of three steps of chroma compression/extension processing, lightness correction and lightness compression/extension processing.

In the first place, as shown in FIG. 9A, in the chroma compression/extension processing, the color gamut $R_1$ of the color monitor 12 is compressed in a direction of chroma a while keeping the lightness value to be constant such that the maximal chroma value $S_{max1}$ of the highest chroma point $P_1$ of the color gamut $R_1$ of the color monitor 12 formed in a hue plane with chroma s plotted on the horizontal axis and lightness v plotted on the vertical axis comes to be the chroma value $S_c$ of the common region highest chroma point $P_3$ of the common region $R_3$ of the color gamut $R_1$ of the color monitor 12 and the color gamut $R_2$ of the color printer 14.

The chroma a is represented by $(a^{*2}+b^{*2})^{(1/2)}$ on the uniform color space in which the color reproducing space is represented by v, a* and b*. In an embodiment shown in FIG. 9A, a point $A_{13}$ of the chroma value S is transformed into a point $A_{14}$ of the chroma value $S_n$.

In the present embodiment, the color gamut $R_1$ is essentially compressed for being transformed into the common region $R_3$ of the color gamuts $R_1$ and $R_2$; however, the present invention is by no means limited to this type and an enlargement transformation into the color gamut $R_2$ of the color printer 14 can also be performed by adjusting a compression/extension ratio k using a compression/enlargement transformation equation which will be described below in accordance with the color gamut $R_2$ of the color printer 14.

A method of compression or extension is performed in accordance with the following equation (1):

$$F=(k-1)\cdot X^2 + X \qquad (1)$$

wherein k represents compression/extension ratio.

FIG. 9B, which is a chart illustrating transformation of the embodiment shown in FIG. 9A, shows a transformation curve $D_1$ which compresses the maximal chroma value $S_{max1}$ of the color gamut $R_1$ in a leftward direction in the figure to be the chroma value $S_c$. The transformation curve D, compresses the chroma value on the vertical axis from 0 to $S_c$, when the chroma value on the horizontal axis changes from 0 to $S_{max1}$. While, a transformation direct line $D_2$ in the figure does not perform compression or extension. Therefore, any curve in a range above the transformation direct line $D_2$ in the figure performs transformation such that the color gamut is enlarged.

The transformation curve $D_1$ can be obtained by adopting the equation (1) in which the chroma value with a chroma value range of 0 to $S_{max1}$ is divided by the chroma value $S_{max1}$ and standardized in a range X of between 0 to 1 and the chroma value to which the initial data is to be transformed is also divided by the chroma value $S_{max1}$ and standardized in a range of F of between 0 to 1. In this case, $k=S_c/S_{max1}$ in the equation (1). This is because, when X=1 is assigned, F becomes k, namely, F=k; therefore, in the above embodiment, "X=1" is transformed into $S_{c/Smax1}$.

When the neighborhood of "X=1" of the transformation curve $D_1$ has a gradient close to that of the transformation direct line $D_2$, namely, in the neighborhood of 0 of the chroma value of the color gamut $R_1$, compression is barely performed by transformation, while, as the chroma value becomes larger, the gradient of the transformation curve $D_1$ becomes smaller than that of the transformation direct line $D_2$ so that larger compression is performed; hence, in this case, non-linear compression transformation becomes possible. On the other hand, enlargement transformation can be performed by taking a value of the compression/extension ratio k as more than 1. In the present embodiment, the non-linear transformation is performed in accordance with the equation (1); however, it may be performed in accordance with any other known method.

As shown in FIG. 9C, the lightness correction is a site which corrects the lightness of the color gamut $R_1'$ obtained by compressing the color gamut $R_1$ by the above-described compression/extension processing in the same hue plane while maintaining the initial chroma. Such lightness correction to be performed in the same hue plane does not execute correction, when the chroma value is 0, and corrects the highest chroma point of the color gamut $R_1'$ to the common region highest chroma point $P_3$ which is the highest chroma point of the common region $R_3$ of the color gamuts $R_1$ and $R_2$ such that a lightness correction amount changes in a non-linear manner as the chroma value becomes higher, when the chroma value is between more than 0 and the chroma value $S_c$ of the common region highest chroma point $P_3$. For example, a point $A_{15}$ in the figure is corrected into a point $A_{16}$ by a correction amount to be obtained in accordance with the equation (6) described below and the lightness value v is corrected into the lightness value v' in the same manner as described above.

In such a way, the lightness value is corrected from the color gamut $R_1'$ whereupon a point having the maximal chroma comes to coincide with the common region highest chroma point $P_3$ of the common region $R_3$ to obtain a color gamut $R_1''$.

Such a correction of the lightness value can define a correction amount F by the following equation (6), for example, if the range between the chroma value 0 of the common region $R_3$ and the chroma value $S_c$ of the highest chroma point $P_3$ is divided by the chroma value $S_c$ and the resultant standardized value is written as X and the correction amount in a direction of lightness is written as F:

$$F = (V_{max1} - c) \cdot x^2$$

The lightness compression/extension processing compresses or extends the color gamut $R_1''$ in a direction of the lightness v so that the color gamut is transformed to be present in the common region $R_3$. This processing is performed because, as shown in FIG. 9D, the color gamut $R_1''$ is not contained in the common region $R_3$ of the color gamuts $R_1$ and $R_2$ and, as a result, not always contained in the color gamut $R_2$.

Such a lightness compression/extension is a non-linear compression or extension in which an edge part of the color gamut to be compressed or extended is subjected to a largest ratio of the compression or extension whereas the other part is subjected to a smaller ratio of the compression or extension as it comes away from the edge part. For example, a transformation curve $D_3$ shown in FIG. 9E can be obtained using the standardized equation (1). Namely, if a point having a maximal lightness value $V_{1c}$ and another point having a minimal lightness value $V_{1d}$ each of the color gamut $R_1''$ on a direct line $D_5$ of the chroma value $S_n$ shown in FIG. 9D are written as $A_{17}$ and $A_{18}$, respectively, the lightness values on these two points, that is, the maximal and minimal values $V_{1c}$ and $V_{1d}$, are transformed into lightness values $V_{cu}$ and $V_{cd}$ on a point $A_{19}$ and a point $A_{20}$, respectively; the point $A_{19}$ is an intersection between the direct line $D_5$ and an edge of the common region $R_3$ and the point $A_{20}$ is another intersection between the direct line $D_5$ and another edge of the common region $R_3$. Further, a median point which is located in the middle of the points $A_{17}$ and $A_{18}$ is set as a fixed point on which no compression or extension is performed. As a point in the color gamut moves away from the median point toward any of the points $A17$ and $A18$, the compression ratio becomes larger and, as a result, the transformation on each of the points $A_{17}$ and $A_{18}$ is performed with the maximal compression ratio. Namely, as shown in FIG. 9E, the gradient of the transformation curve $D_3$ at the chroma value $V_{mid1}$ is equal to that of the transformation curve $D_4$.

The above transformation method is described in detail below. As shown in FIG. 10, when the lightness value $V_1$ (h, s) (h and s represent the hue and chroma values, respectively) of the color gamut $R_1''$ at the same hue and chroma values as that before transformation is transformed into the lightness value $V_2$ (h, s), the lightness region $V_{1d}$ to $V_{1u}$ is transformed into the lightness region $V_{cd}$ to $V_{cu}$ making use of the equation (1) while keeping the value $V_{mid1}$ to be the same even after transformation.

Figure 10A:
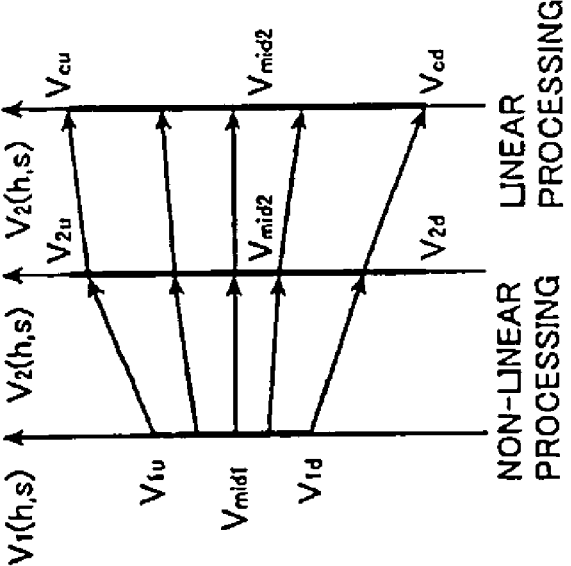
FIGS. 10A to 10C each illustrate an embodiment of compressing/extending lightness in the method of compressing/extending a color reproducing space according to the present invention.
Figure 10B:
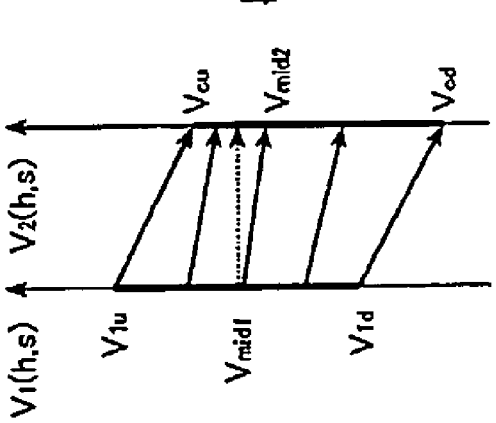

Since the compression ratio or extension ratio becomes the maximal at the lightness values $V_{1d}$ and $V_{1u}$, the above-described maximal compression ratio or maximal extension ratio may in some cases surpass the predetermined maximal compression ratio or maximal extension ratio depending on the size or form of the color reproducing space of the color printer 14 to prevent the image information from being lost. FIG. 10B shows the transformation method when the compression ratio at the lightness value $V_{1u}$ surpasses the maximal compression ratio. In this case, the lightness value $V_{mid2}$ to which the initial data is to be transformed corresponding to the median value, namely, the lightness value $V_{mid1}$ is adjusted by moving it downward so that the compression ratio at the lightness value $V_{cu}$ becomes the maximal value.

As described above, when the maximal compression ratio or maximal extension ratio at the lightness values $V_{1d}$ and $V_{1u}$ surpasses the predetermined maximal compression ratio or the maximal extension ratio, the median point which is located in the middle of the maximal lightness value and the minimal lightness value is not taken as a fixed point and, as a result, a point in the color reproducing space already transformed corresponding to the median point is moved such that the compression ratio or extension ratio becomes the maximal at the maximal and minimal lightness values.

Figure 10C:
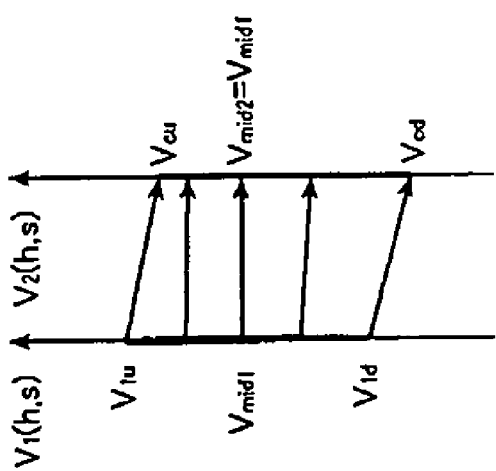

Moreover, even with the above-described method, transformation can not be performed such that the compression or extension ratio at the time of the transformation is to be within the maximal compression or extension ratio in some cases, depending on the size or form of the color reproducing space of the color printer 14. In order to meet this end, as shown in FIG. 10C, the transformation is set to be performed in two steps: in a first step, a non-linear processing is performed with the maximal compression or extension ratio in the same manner as that in the transformation shown in FIG. 10A while the lightness value $V_{mid1}$ is fixed; in a second step, a linear processing is performed on the resultant transformed lightness region. The linear processing in this case is referred to a processing performed by primary transformation between the lightness values in the color reproducing space yet to be transformed and the color reproducing space already transformed. By executing such a two-step transformation, it becomes possible to keep the compression or extension ratio at the time of transformation within the maximal compression or extension ratio.

In such a manner described above, the compression/extension processing of the color reproducing space of the color monitor is performed (step 110).

Since the compression/extension processing of the color reproducing space comprises the steps described above, a correspondence to a different image I/O device can be established while maintaining the color gamut in a smooth manner and preserving the initial color appearance and gradation.

By the method described above, the color reproducing space of the color monitor 12 can correspond with the color reproducing space of the color printer 14 and; therefore, the transformation method from the color monitor 12 to the color printer 14 of image data which is to be inputted into the image processing apparatus 10 is set. The thus set transformed method is stored in a memory not shown. The transformation of this transformation method represents a function or a transformation equation for transformation which is to be executed in each of the above-described steps. It should be noted that the image data may be transformed by the above-described function or transformation equation for each step, but that transformations in respective steps are put together in one lot, a look-up table (LUT) having a multiplicity of data sets of before and after transformations is stored and then correspondence of image data may be executed by the thus stored look-up table.

When the look-up table is utilized, if the image data does not correspond to any of the multiplicity of the data sets thus previously stored, the image data in the color reproducing space already transformed may be obtained by interpolation. The interpolation method in this case may be any conventional interpolation method.

On the other hand, R, G and B image data inputted into the image processing apparatus 10 are represented on the color monitor 12; moreover, the R, G and B image data is transformed into tristimulus value XYZ color matching system by the equation (2) in the uniform color space transforming section 16 and then the thus transformed tristimulus values (X, Y and Z) are transformed into psychometric lightness v and perceived psychometric chromaticities a* and b* (hue and chroma) of CIEL*a*b* color matching system by the equations (3) to (5).

The thus obtained image data represented by the psychometric lightness v and perceived psychometric chromaticities a* and b* are subjected to the transformation determined by the above-described method and the resultant data are sent to the output image data transforming section 26 in which the thus sent data are then transformed onto the color reproducing space of the color printer 14; the image data represented by the psychometric lightness v and perceived psychometric chromaticities a* and b* are transformed into CMY image data to be set in accordance with output characteristics of the color printer 14. Namely, the image data are transformed into tristimulus XYZ color matching system in accordance with the equations (3) to (5) and further transformed into CMY image data by a known method. Thereafter, the resultant CMY image data are outputted to the color printer 14 on which a desired image is represented.

The compression/extension method according to the present invention in the above embodiment is, as shown in FIG. 2 or 9, to perform correction or compression on the color reproducing range $R_1$ into the common region $R_3$ which is common to the color reproducing range $R_1$ and the color reproducing range $R_2$; however, as described below, the compression/extension method of the color reproducing space relates to transformation into an area within the color reproducing range $R_2$; nevertheless, the method may perform correction, compression or extension on the color reproducing range around the common region $R_2$ set by an adjustment parameter in accordance with the customer's preference. The last method will now be described below.

Figure 11A:
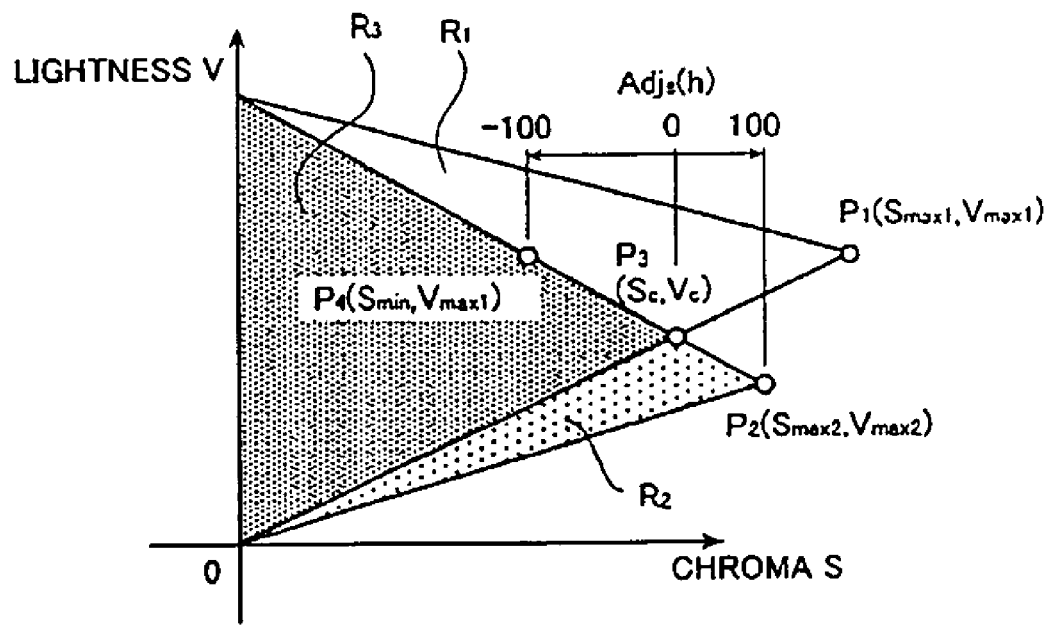
FIGS. 11A and 11B each illustrate another embodiment of compression/extension processing in the method of compressing/extending color reproducing space according to the present invention.

In the compression/extension of the chroma which constitutes compression/extension processing (step 110), as shown in FIG. 11A, first of all, a point $P_4$ which is located on an edge of the color reproducing range $R_2$ of the color printer 14 which has the same lightness value as the lightness value $V_{max1}$ of the point $P_1$ that has the maximal chroma value $S_{max1}$ of the color reproducing range $R_1$ of the color monitor 12 is determined; next, a common region highest chroma point $P_3$ is determined from the common region $R_3$ of the color reproducing range $R_1$ and the color reproducing range $R_2$; then, a corrected range $R_4$ in the color reproducing space to which the initial data is to be transformed by the chroma compression/extension is set around the chroma value of this common region highest chroma point $P_3$ with the chroma value $S_{min}$ of the previously determined point $P_4$ as being the minimal chroma value using a chroma range adjustment parameter adjs which adjusts the chroma range that has set the maximal chroma value $S_{max1}$ of the point $P_1$ as being the maximal chroma value. The chroma range adjustment parameter Adjs is set within a range of from −100 to +100 when the chroma value $S_{min}$ and chroma value $S_{max1}$ are set as −100 and +100, respectively. As shown in FIG. 8, this chroma range adjustment parameter Adjs is obtained as a chroma range adjustment parameter in relation with R, Y, G, C, B and M primary colors. For hues other than the above-described primary colors, as shown in FIG. 7, the chroma range adjustment parameter Adjs(h) is determined for each hue value h by interpolation using the chroma adjustment parameter Adjs of a primary color which is to be sandwiched from both sides thereof on the chromaticity diagram. By doing such a way, the chroma range adjustment parameter is determined for each hue value h to determine the color reproducing space to which the initial data is to be transformed through the transformation by the compression/extension of the chroma on the color space.

Transformation of the compression or extension of the chroma is a non-linear transformation using the equation (1) in the same way as in FIGS. 9A and 9B. It should be noted that the transformation may of course be any other non-linear transformation using any known method other than the above-described method.

Next, the lightness correction corrects the highest chroma point $P_6$ of the corrected range $R_4$ of the color reproducing space already transformed which has been obtained by compression or extension of the chroma into a point $P_6$ on the edge of the color reproducing range $R_2$ having the same chroma value $S_f$ as the highest chroma point $P_5$ has to obtain a corrected range $R_5$. In a method of this correction, a non-linear correction is performed in a similar way to that in correcting the lightness as shown in FIG. 9C such that no correction is executed when the chroma is 0 and the correction amount is sharply increased as the chroma value becomes larger.

Figure 11B:
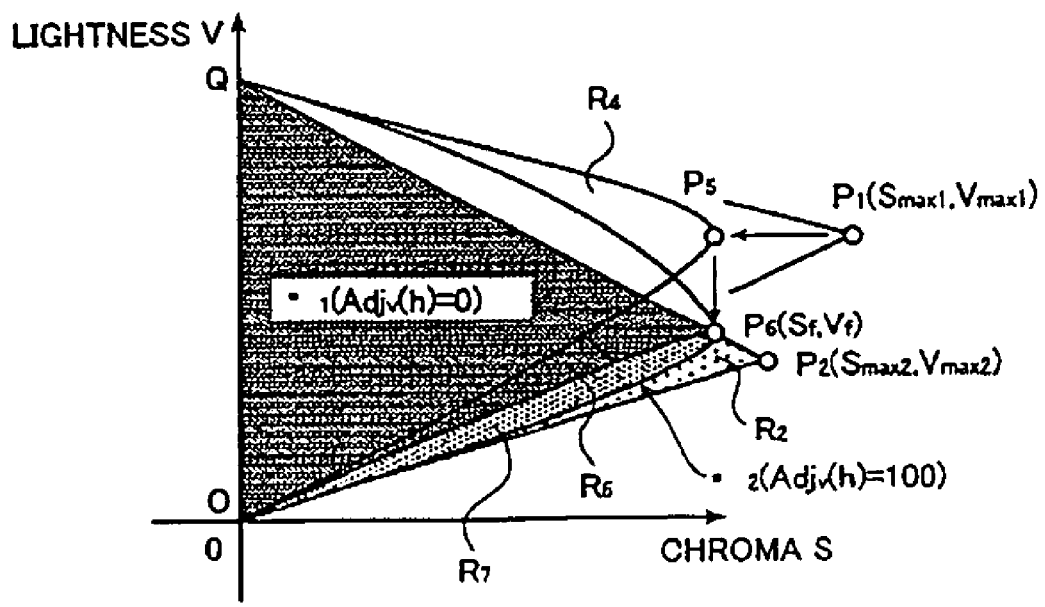

As shown in FIG. 11B, the compression/extension of the lightness determines a range which belongs to both of the common region $R_3$ of the color gamuts of the color monitor 12 and the color printer 14 and the corrected range $R_5$ which has been corrected by the lightness correction described above as a coincidence emphasis region $R_6$. Namely, the coincidence emphasis region $R_6$ shown in the figure is an area within a nearly triangular shape which, when a point on the lightness v axis having a maximal lightness value of the color gamut $R_2$ is written by Q, an origin at which the lightness v axis and the chroma s axis crosses with each other is written by the origin 0, begins at the origin 0, moves along a curve $1_1$ to the point $P_6$, further moves from there to the point Q and then comes back from there to the origin 0.

On the other hand, a range that is formed by replacing an edge $OP_2$ with an curve $1_1$ which is located outside the coincide emphasis region R6 and inside the color gamut of the color gamut $R_2$ of the color printer 14, curves more largely in a non-linear manner inside the color gamut $R_2$ as the chroma value becomes apart from the origin 0, namely, larger and reaches the corrected highest chroma point $P_6$ at the chroma value of the corrected highest chroma point $P_6$ is determined as a color gamut emphasis region $R_7$. Namely, in FIG. 11B, the range inside a nearly triangular shape which begins at the origin 0, moves along a curve $1_2$ to the point $P_6$, further moves from there to the point Q and then comes back from there to the origin 0 is determined. The curve $1_1$ may be any curve so long as it is inside the color gamut of the color gamut $R_2$ of the color printer, moves along the edge $OP_2$ in the neighborhood of the origin 0, curves in a non-linear way inside the color gamut $R_2$ as the chroma value becomes larger and reaches the corrected highest chroma point $P_6$ at the chroma value of the corrected highest chroma point $P_6$; preferably, the color gamut emphasis region $R_7$ has a large area of the color gamut $R_2$ of the color printer 14 and, being based on the above, it is preferable that the curve $1_2$ is overlapped with the edge $OP_2$ of the color gamut $R_2$ of the color printer 14 as much as possible in a low chroma range.

Primarily, it is preferable that the color gradation or appearance of the output image of the color printer 14 coincides with that of the color monitor 12 while it is preferably outputted in an area as large as possible of the color gamut $R_2$ of the color printer 14. Under these circumstances, the coincidence emphasis region $R_6$ is set as the color gamut such that intensity or the like of lightness or chroma is not influenced by the compression or extension of the color gamut while a range as large as possible is set as the color gamut emphasis region $R_7$ is set such that the transformation is performed into an area as large as possible within the color gamut $R_2$ of the color printer 14. The curve 12 of the color gamut emphasis region $R_7$ is convex downward in comparison with the curve $1_1$ of the coincide emphasis region $R_6$ whereupon the color gamut emphasis region $R_7$ is set as an range as large as possible within the color gamut $R_2$ in an area of the nearly triangular shape which has the point $P_6$ as a vertex.

The present invention can set a corrected lightness region $R_8$ using the coincidence emphasis region $R_6$ and the color gamut emphasis region $R_7$ in accordance with the customer's emphasis as to whether the coincidence of color is emphasized or the reproduction of color in a large area is emphasized.

Figure 12:
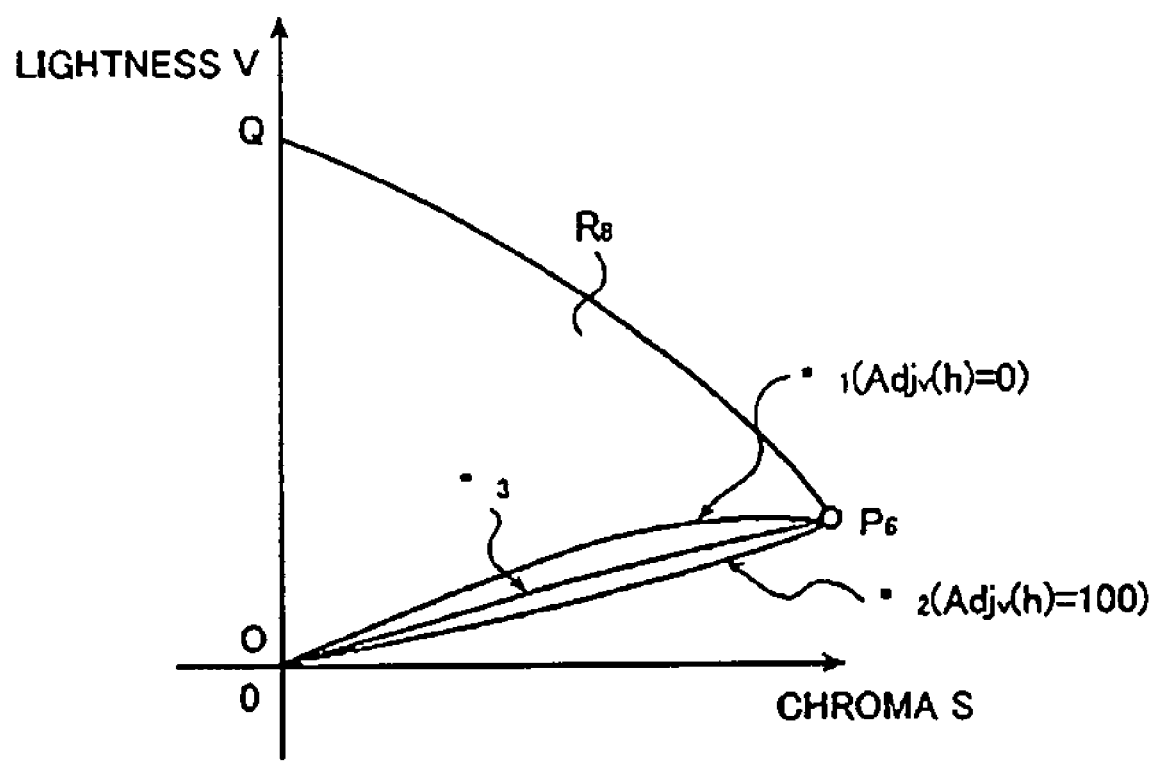
FIG. 12 is a view further illustrating the embodiments of compression/extension processing shown in FIGS. 11A and 11B in the method of compressing/extending a color reproducing space according to the present invention.

Namely, the coincidence emphasis region $R_6$ with the curve $1_1$ as an edge and the color gamut emphasis region $R_7$ with the curve $1_2$ as an edge are adjusted using the lightness region adjustment parameter Adjv of primary colors of R, Y, G, C, B and M shown in FIG. 8, in accordance with the customer's preference. The adjusting method is as follows: The lightness adjustment parameter Adjv of the curve $1_1$ is set as 0 while the lightness adjustment parameter Adjv of the curve $1_2$ is set as 100. An interpolation curve $1_3$ is determined, as shown in FIG. 12, by inputting any number in a range of from 0 to 100 by the customer. The corrected lightness region $R_6$ with the thus determined interpolation curve $1_3$ as an edge is determined. This corrected lightness region $R_9$ is determined for each hue. For colors other than primary colors of R, T, G, C, B and M, a correction amount is set by interpolation in accordance with the interpolation method shown in FIG. 7. Thus, the corrected lightness region $R_8$ is determined for each hue.

The thus determined corrected lightness region $R_8$ is a target range of compression or extension of the lightness whereupon transformation processing from the corrected range $R_6$ to the corrected range $R_8$ is performed. The lightness compression/extension method is the same as that shown in FIGS. 9D, 9E or FIGS. 10A to 10C whereupon a non-linear transformation is performed.

According to the present invention, the coincidence emphasis region and the color gamut emphasis region are related to lightness; however, they are by no means limited to lightness and may be related to chroma or the like.

As described above, the hue can be transformed in a smooth manner in accordance with a customer's preference by using the hue adjustment parameter Adjh; the corrected lightness region can be set to be within the coincidence emphasis region and the color gamut emphasis region; the transformation with the thus set corrected lightness region as being the target range is performed; hence, the transformation corresponding to the customer's preference can easily be obtained.

The method of compressing/extending the color reproducing space of the first aspect according to the present invention is constituted as described above.

Next, a color reproducing method of a second aspect according to the present invention and a color reproducing apparatus of a third aspect according to the present invention will now be described in detail with reference to FIGS. 13 to 18.

Embodiments to be described below not only externally output a monitor image or the like from a print image but also produce a color transformation table having a good balance between two characteristics: one is coincidence of images between an initial print image and a print image recovered by transforming back the thus externally outputted data and the other is color reproducibility to be obtained when data of a CG, a digital camera or the like are processed as external output data to produce a print. In other words, the embodiments produce the color transformation table for use in apparatuses having different color gamuts, more broadly, in different color space formats.

Figure 13:
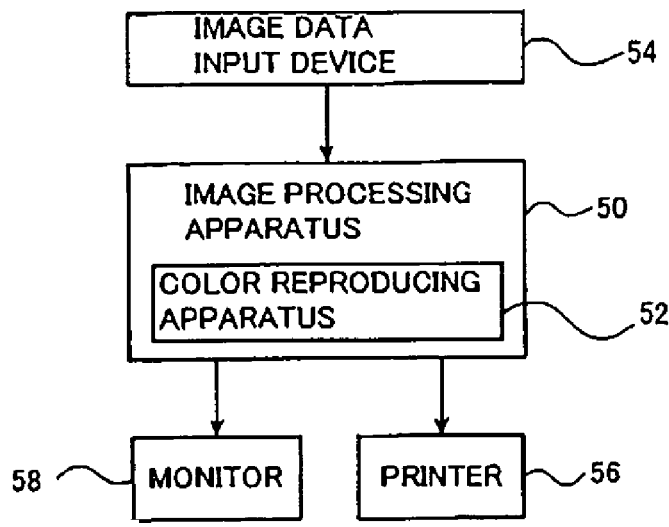
FIG. 13 is a block diagram schematically showing an image processing apparatus having a color reproducing apparatus according to an embodiment of the present invention.

FIG. 13 is a diagram schematically showing a construction of an embodiment of an image processing apparatus having a color reproducing apparatus pertaining to an embodiment of the third aspect according to the present invention. The image processing apparatus 50 has the color reproducing apparatus 52 therein and, moreover, has an image input device 54, a printer 56 for outputting an image therefrom and, further, a monitor 58 connected thereto. The image input device 54 is by no means limited to any specific type, but, for example, a color scanner or the like which reads the image photoelectrically or a apparatus which inputs image data that has been digitized from a floppy disk or the like may be permissible. In any case, the image processing apparatus processes the image input data as digital data.

The image processing apparatus 50 executes various types of image processing such as color balance adjustment, gradation adjustment, color adjustment, density adjustment, chroma adjustment, electronic magnification, contrast adjustment, sharpness enhancement (edge enhancement, sharpening) or the like while the color reproducing apparatus transforms image data after image processing into image data conforming to a color gamut of various image output apparatuses such as the printer 56, the monitor 58 or the like.

Figure 14:
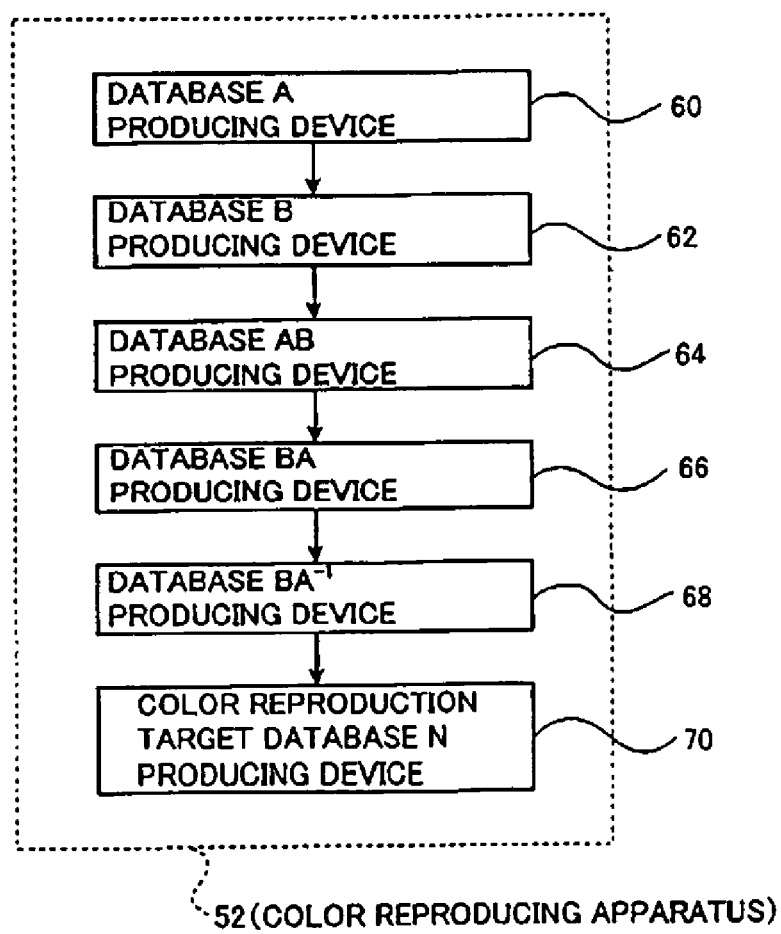
FIG. 14 is a block diagram schematically showing the color reproducing apparatus shown in FIG. 13.

FIG. 14 is a block diagram schematically showing an embodiment of the color reproducing apparatus 52. The color reproducing apparatus comprises a database A producing device, a database B producing device, a database AB producing device, a database BA producing device 66, a database $BA^{-1}$ producing device 68 and a color reproducing target database producing device 70.

The database A producing device 60 produces the database A representing transformation comprising the input image data to the printer 56 (a first image input apparatus) as an input, transformation of the input into a reproducing color of the printer 56 and a consequence of such transformation as an output.

The database B producing device 62 produces the database B representing transformation comprising the input image data to the monitor 58 (a second image input device) as an input, transformation of the input into a reproducing color of the monitor 58 and a consequence of such transformation as an output.

Figure 15:
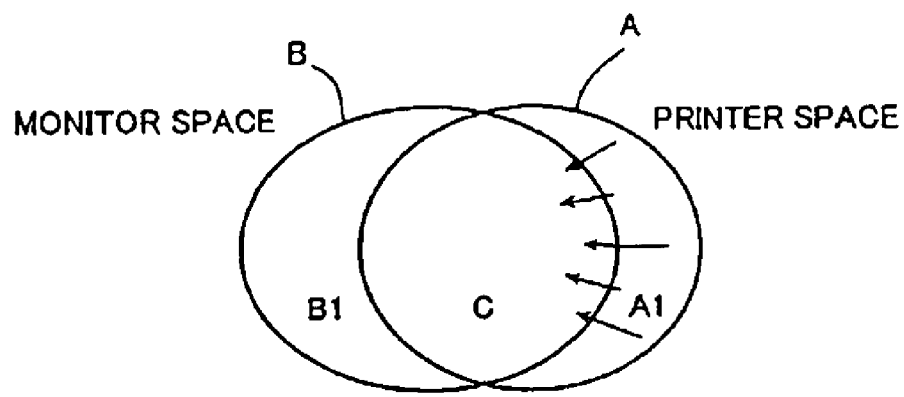
FIG. 15 schematically illustrates database showing the color gamuts of a printer and a monitor.

FIG. 15 schematically shows these databases A and B which show color gamuts of respective image input devices (printer 56 and monitor 58).

Namely, in FIG. 15, a color gamut A of the printer 56 is shown as being $A_1+C$ while a color gamut B of the monitor 58 is shown as being $B_1+C$ whereupon C represents a common area in both color gamuts.

Ordinarily, the color gamuts of the color spaces of the printer and the monitor are different from each other so that, when a calorimetric mapping is performed, information $A_1$ of the color space of the printer which can not be reproduced in the color space of the monitor is lost and the initial color space of the printer can not be reproduced even if the color space of the monitor is tried to be transformed back again to the color space of the printer. In order to prevent this from happening, as shown in arrows in FIG. 15, data in the neighborhood of $A_1$ of the color space of the printer is corrected by using, for example, compression or the like to allow it to move into within the color space of the monitor in a smooth manner and then, in accordance with the result, print data may be transformed into monitor data. In this case, when monitor data come, if a reverse transformation is performed thereon, then the data can be brought back to the initial data in a natural manner and to a level which causes no problem.

However, when ordinary image data of, for example, CG image, digital camera image or the like enter as a monitor image, this image is not compressed so that, if this image is outputted into the printer, extension from the database B to the database A is only executed and, as a result, an inappropriate print reproduction occurs.

In order to prevent this from happening, a method which changes transformations on an image source basis may be possible; however, this method is not appropriate for an image which is a mixture of output data and the CG image.

Under the above circumstances, the present embodiment performs the transformation which has a good balance between reversibility from a printer signal to a monitor signal and reproducibility of an ordinary image data from an outside source.

The database AB producing device 64 transforms the color gamut of the printer 56 into within the color gamut of the monitor 58 while maintaining the gradation to produce the database AB. For example, as described above, the data in the neighborhood of $A_1$ of the color space of the printer is corrected in a smooth manner by using compression or the like as shown by the arrow in FIG. 15 and, according to the result, the print data is transformed into the monitor data.

The database BA producing device 66 transforms the color gamut of the monitor 58 into within the color gamut of the printer 56 while maintaining the gradation to produce BA database. This database BA is produced in the same manner as that in the database AB.

Taking the above-described database BA as a typical example, an embodiment of the specific producing method thereof is described in detail below with reference to FIG. 16.

Figure 16:
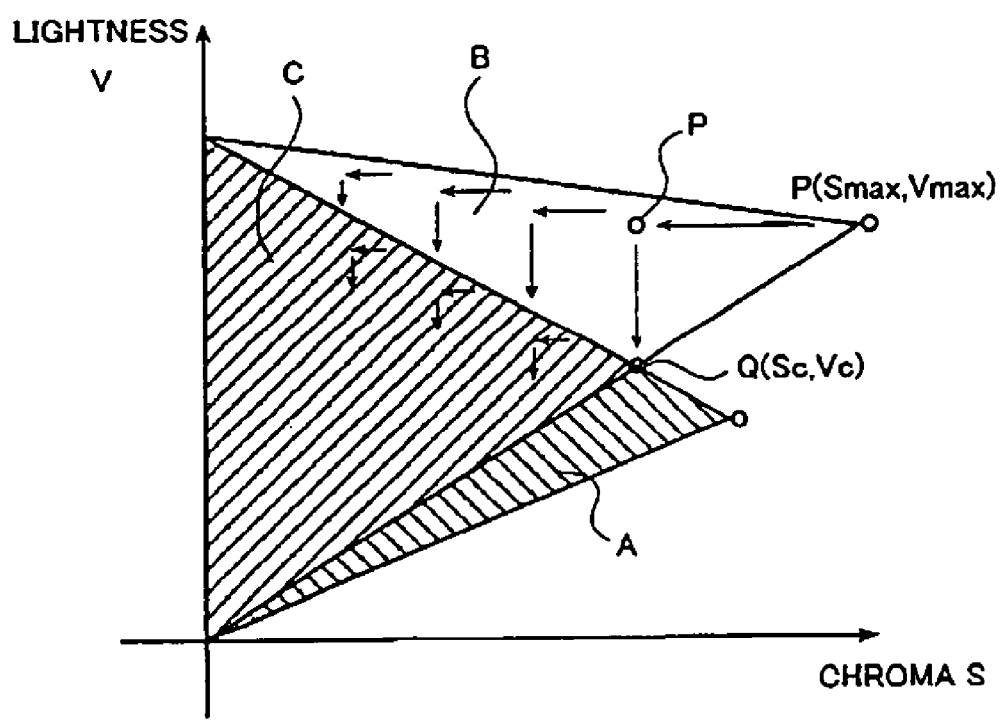
FIG. 16 illustrates an aspect of transformation from the color gamut of the monitor to the color gamut of the printer.

FIG. 16 shows the color gamuts of the printer 56 and the monitor 58 on a hue plane on the uniform color space represented by psychometric lightness v of CIEL*a*b* color matching system and color coordinates a* and b*. In this case, the color gamuts of the monitor 58 and the printer 56 are shown by the color gamuts B and A, respectively. Chroma s on the horizontal axis is shown by $(a^{*2}+b^{*2})^{1/2}$.

Moreover, when a white point (a point having a maximal value of the lightness v) or a black point (a point having a minimal value of the lightness v) in the color reproducing space is not present on the lightness axis v due to a difference of an observing light source or an input/output device, an adjustment (light source transformation) is performed and further a lightness region is adjusted such that lightness regions of the input/output devices coincide with each other.

As shown in FIG. 16, the database BA producing device 66 compresses the color gamut B in a direction of chroma s such that the maximal chroma value $S_{max}$ of the color gamut B of the monitor 58 comes to be the chroma value $S_o$ of the highest chroma point Q in the common region C of the color gamuts A and B in a hue plane. In the present embodiment, compression is necessarily performed for transformation into the common region C of the color gamuts A and B; however, the present invention is by no means limited to this type and enlargement transformation may be performed such that extension into within the color gamut A of the printer 56 is executed by using a specified compression/enlargement equation and adjusting a compression/extension ratio, in accordance with the color gamut A of the printer 56.

Next, lightness of a color gamut B' (not shown) obtained by compressing the color gamut B is corrected on a same hue plane. Such a lightness value correction to be performed in the same hue plane does not executes correction, when the chroma value is 0, and corrects the highest chroma point P' of the color gamut B' to a highest chroma point Q of the common region C of the color gamuts A and B such that a lightness correction amount changes in a non-linear manner as the chroma value becomes higher, when the chroma value is between more than 0 and the chroma value $S_c$ of the highest chroma point Q of the common region C. The lightness of color gamut B' obtained by compressing the color gamut B is corrected in such a way as described above to obtain a color gamut in which the highest chroma point P coincides with the highest chroma point Q of the common region C. Thus, the database BA in which the color gamut of the monitor 58 shown by the database B has been transformed into within the color gamut of the printer 56 shown by the database A is produced.

The database $BA^{-1}$ producing device 68 obtains inverse transformation of the transformation from the database B to the database A by an inverse operation and then performs the thus obtained inverse transformation on the color gamut of the printer 58 shown by the database A to produce the database $BA^{-1}$ in the database B.

A method of producing such a database $BA^{-1}$ will be described below with reference to FIG. 17.

Figure 17:
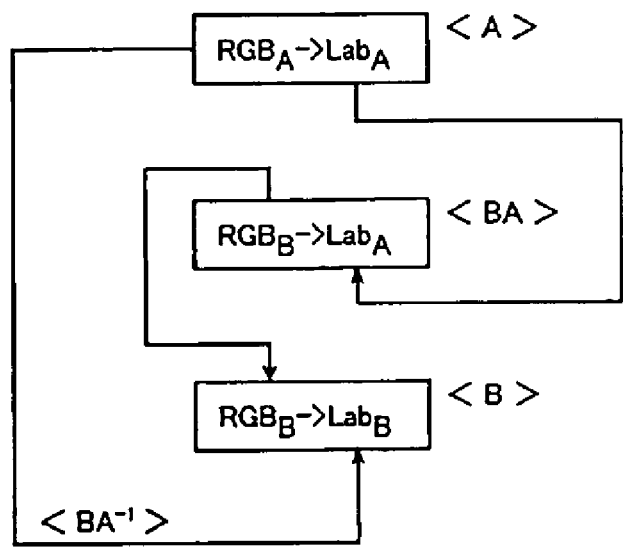
FIG. 17 is a block diagram exemplifying a method of constructing a database $BA^{-1}$.
Figure 18:
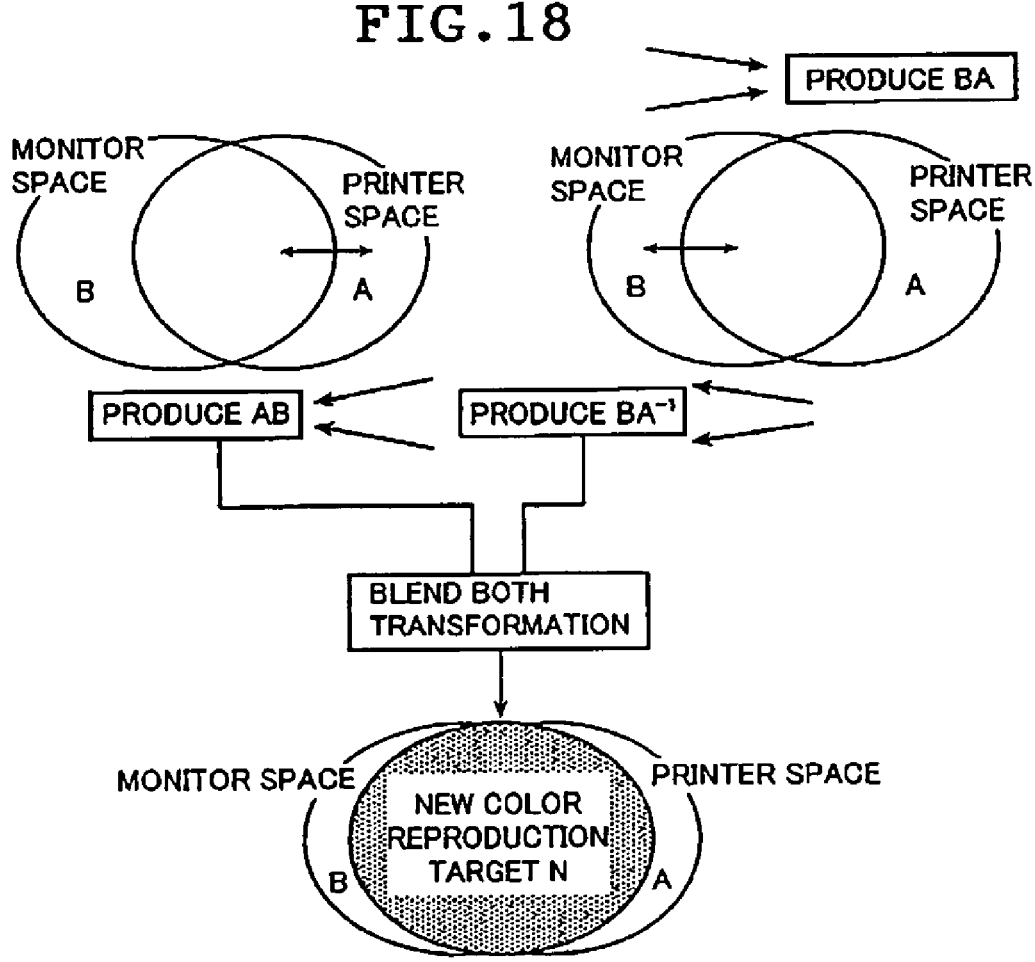
FIG. 18 illustrates an aspect of constructing a color reproduction target database N.

FIG. 17 shows an embodiment of a method of producing the database $BA^{-1}$. In this embodiment, input and output are represented by RGB and L*a*b*, respectively.

FIG. 17 shows states in which the database A transforms input image data $RGB_A$ to the printer 56 into output image data $Lab_A$ of the monitor 58, the database BA transforms input image data $RGB_B$ to the monitor 58 into the output image data $Lab_A$ of the printer 56 and the database B transforms the input image data $RGB_B$ to the monitor 58 into output image data $Lab_B$ of the monitor 58.

The input data RGB ($RGB_A$) of the database AB keeps the same value on the database A of the printer 56, however, the color gamut thereof is corrected relative to the database B and, as a result, the output consequence L*a*b* ($Lab_B$) becomes a value on the database B. In the database $BA^{-1}$, in the same way as with the database AB, the input data RGB takes a value on the database A and the output consequence L*a*b* a value on the database B.

First of all, taking the output value $Lab_A$ of the database A as the output value of the database BA, the transformation in the database BA is inversely operated to obtain an input to obtain an input value $RGB_B$ of the database BA. Next, taking the thus obtained input value $RGB_B$ of the database BA as an input value of the database B, the output value Lab,, of the database B is determined.

Further, the input value $RGB_A$ of the first database A and the output value Labs of the last database B are combined to obtain the database $BA^{-1}$ which shows inverse transformation of the database BA that shows transformation from the above-described database B to the database A.

Lastly, in the color reproduction target database N production device 70, the above-described database AB and the above-described database $BA^{-1}$ are appropriately weighted and then mixed in a linear manner while keeping an appropriate balance therebetween to produce the color reproduction target database N.

The above description is illustrated in FIG. 16 in a summary manner. Namely, the transformation database AB on the transformation from the color gamut A of the printer to the color gamut B of the monitor is produced; the transformation database BA on the transformation from the color gamut B of the monitor into the color gamut A of the printer is produced; the database $BA^{-1}$ which shows the inverse transformation of the database BA described above is determined; both the thus produced database AB and the thus determined database $BA^{-1}$ are mixed with each other in a linear manner; hence, the color reproduction target database N is produced.

In the present embodiment, the transformation database from the printer to the monitor and the inverse transformation database of the transformation from the monitor to the printer are determined and, then, the resultant two databases are added with an arbitrary adding ratio therebetween to produce a new target having an appropriate balance therebetween.

As a result, it has become possible to achieve a color reproduction having a good balance between an image coincidence between an initial print image and a print image recovered by transforming back an image once externally outputted as a monitor image or the like after the initial print image has been transformed thereto, and reproducibility to be obtained when data of CG, a digital camera or the like are processed as external output data to produce a print.

Color correction at the time of producing the databases AB and BA is performed mainly by means of compression. The database $BA^{-1}$ produces components in a reverse direction to those in the database BA so that the thus produced components are mainly composed of extending ones.

When the databases AB and $BA^{-1}$ are mixed, if the mixing ratio of the database AB is 100%, the color of the color space of the printer is substantially preserved at the time of reciprocal transformation of data; however, reproduction of ordinary monitor image which has not been compressed appears inappropriately. In contrast, if the mixing ratio of the database $BA^{-1}$ is 100%, the ordinary monitor image appears appropriately; however, coincidence property of a reproduced print is deteriorated. Therefore, a mixing ratio having a best balance between the above-described two factors is specified to produce the color reproduction target N.

In the above embodiment, a design starts from a printer side; however, it should be noted that it is of course permissible to start from a monitor side.

Once the color reproduction target database N is determined, it is easy to produce a transformation table ab from the printer to the monitor based on the thus determined database N. Moreover, it is also easy to produce a transformation table $ab^{-1}$ from the monitor to the printer by performing an inverse operation.

As a method of performing various types of above-described inverse operations, Newton-Raphson method (iterative search method) is conventionally well known. When the inverse operation is performed, it sometimes becomes necessary to handle data outside the color gamut. In this case, the database may virtually be expanded.

The color reproduction method of the second aspect of the present invention and the color reproduction apparatus of the present invention are basically composed of as described above.

While the method of compressing/extending the color reproducing space of the first embodiment according to the present invention, the color reproducing method and apparatus of the second and the third embodiments according to the present invention has been described above in detail, it should be noted that the invention is by no means limited to the foregoing embodiments and various improvements and modifications may of course be made without departing from the scope and spirit of the invention.

As described above in detail, according to the first embodiment of the present invention, the image output device having a different color reproducing space can correspond to another image I/O device having a different color reproducing space while preserving the color gamut in a smooth manner and maintaining the color appearance and gradation such that correspondence to another image I/O device having a different color reproducing space while preserving the color gamut in a smooth manner and maintaining the color appearance and gradation can be attained such that a desired color matching with another image output device having a different color reproducing space, for example, the color monitor or the like, while making use of a range within the color reproducing space.

Moreover, correspondence to the image I/O device having a different color reproducing space can easily be adjusted in accordance with the customer's preference.

As described above, according to the second and third embodiments of the present invention, it has become possible to achieve a color reproduction having a good balance between an image coincidence between an initial print image and a print image recovered by transforming back an image once externally outputted as a monitor image or the like after the initial print image has been transformed thereto, and reproducibility to be obtained when data of a CG, a digital camera or the like are processed as external output data to produce a print.

What is claimed is:

1. A method of compressing/extending a color reproducing space for transforming a color reproducing space of a first image input/output device into a color reproducing space of a second image input/output device, comprising:

a chroma compressing/extending step which compresses or extends chroma of a color gamut of the first image input/output device represent within the same hue plane in a uniform color space in said same hue plane;

a lightness correcting step for correcting lightness of the color gamut compressed or extended by the chroma compressing/extending step, said lightness correcting step not executing correction of the lightness when a chroma value is 0, correcting a highest chroma point having a maximal chroma value of said compressed or extended color gamut to a specified point in the color gamut represented in said same hue plane of the color reproducing space of said second image input/output device when said chroma value is the maximal chroma value and correcting the lightness such that a correction amount of the lightness changes in a non-linear manner as the chroma value becomes higher when the chroma value is within a range of from more than 0 to less than said maximal chroma value; and a lightness compressing/extending step of compressing or extending the color gamut which has been processed by said chroma compressing/extending step and said lightness correcting step into within the color gamut of said second image input/output device in said same hue plane.

2. The method of compressing/extending the color reproducing space according to claim 1, further comprising:

a color gamut correcting step of correcting an edge form of the color gamut of said second image input/output device in accordance with an edge form of the color gamut of said first image input/output device, before compression or extension to the color reproducing space of said first image input/output device using said method of compressing/extending the color reproducing space is performed.

3. The method of compressing/extending the color reproducing space according to claim 1, further comprising:

a non-linear correcting step which corrects a non-linear portion of an edge form of the color gamut of said first image input/output device or said second image input/output device iri a linear manner, before compression or extension into the color reproducing space of said first image input/output device using said method of compressing/extending the color reproducing space is performed.

4. The method of compressing/extending the color reproducing space according to claim 1, wherein, when the color reproducing space is compressed or extended using the method of compressing/extending said color reproducing space, a adjusting parameter of adjusting at least one of a hue, a chroma range and a lightness region for correcting the color reproducing space is provided to adjust at least one of a corresponding hue, a corresponding chroma range and a corresponding lightness region in the color reproducing space to transform into by compression or extension.

5. The method of compressing/extending the color reproducing space according to claim 4, wherein the adjusting parameter which adjusts at least one of said hue, chroma range and lightness region is an adjusting parameter related to at least one of primary colors.

6. The method of compressing/extending the color reproducing space according to claim 5, wherein a color gamut correction parameter to be calculated for correcting the color reproducing space determines a color gamut correction amount to be added to data of a hue of interest by performing an interpolation in accordance with a position of said hue of interest from said adjusting parameter of primary colors located on both sides of said hue of interest on the uniform color space.

7. The method of compressing/extending the color reproducing space according to claim 2, further comprising:

before said method of compressing/extending the color reproducing space in the color reproducing space of said first image input/output device is performed, a white color/black color adjusting step which, when a white point or black point within the color reproducing space of said first image input/output device or said second image input/output device is not located on a lightness axis on the uniform color space, corrects the white point or a range in the neighborhood thereof or the black point or a range in the neighborhood thereof to correct the white point or the black point to be on said lightness axis;

a lightness region adjusting step for allowing a lightness region of the color reproducing space of said first image input/output device to be set by the position of points of white color and black color which have been adjusted to be on the lightness axis and a lightness region of the color reproducing space of said second image input/output device to coincide with each other by means of enlargement or contraction;

a color gamut correction parameter calculating step which calculates a color gamut correction parameter in accordance with the color gamut the edge form of which is corrected and the resultant corrected edge form of which is set by said color gamut correcting step or said non-linear correcting step; and a color reproducing space calculating step which determines a corrected color gamut for each hue using the color gamut correction parameter calculated in said color gamut correction parameter calculating step and allows the thus determined, corrected color gamut to be the color reproducing space of said first image input/output device which is to be subjected to compression or extension of the color reproducing space, or the color reproducing space of said second image input/output device to compress or extend the color reproducing space into.

8. The method of compressing/extending the color reproducing space according to claim 2 or 3, wherein said color gamut correcting step corrects the edge form of the color gamut of said second image input/output device by allowing a hue of at least one of primary colors in the color gamut of said second image input/output device to coincide with a hue of at least one of the primary colors in the color gamut of said first image input/output device, and wherein, when a lightness change relative to a chroma change of the edge form on the color gamut of said first image input/output device or said second image input/output device is non-linear, said non-linear correcting step corrects the lightness change relative to the chroma change of the edge form on said color gamut in a linear manner within the same hue plane in the uniform color space.

9. The method of compressing/extending the color reproducing space according to claim 1, wherein said lightness compressing/extending step performs a non-linear compression or extension such that a ratio of compression or extension is larger in the neighborhood of an edge of the color gamut to be compressed or extended while the ratio of compression or extension is smaller as a point in the color gamut to be compressed or extended is apart from the neighborhood of the edge.

10. The method of compressing/extending the color reproducing space according to claim 9, wherein, when compression or extension is performed keeping the chroma value to be constant in the color gamut to be compressed or extended, a ratio of compression or extension is fixed as 0 at a middle point having a middle lightness value between a maximal lightness value and a minimal lightness value at a specified chroma value and a ratio of compression or extension is larger as a point is apart from the middle point, and wherein, when the ratio of said compression or extension surpasses a maximal compression or extension ratio which have been previously set, a point to which the middle point is moved by compressing or extending the middle point is moved such that the point is contained within said maximal compression ratio and said maximal extension ratio.

11. The method of compressing/extending the color reproducing space according to claim 10, wherein, when said compression or extension ratio still surpasses the maximal compression or extension ratio which has been previously set even after said middle point is moved by transformation, a point having a middle value between the maximal lightness value and the minimal lightness value at the same chroma value in the color gamut of said second image input/output device as that of said middle point in the color gamut of said first image input/output device is set as a fixed point and then compression or extension is performed such that the compression/extension ratio is 0 at the fixed point, increases as a point is apart from the fixed point and becomes said maximal compression ratio or said maximal extension ratio at the maximal lightness value and the minimal lightness value and, thereafter, compression or extension is performed in a linear manner.

12. The method of compressing/extending the color reproducing space according to claim 1, further comprising the steps of:

predetermining a common region highest chroma point having a maximal chroma value within the same hue plane in a common region of color gamuts of said first image input/output device and said second image input/output device, before said chroma compressing/extending step is performed;

performing compression or extension in which the chroma value at the highest chroma point of the color gamut to be compressed or extended becomes the chroma value of said common region maximal chroma point with respect to the color gamut in said chroma compressing/extending step; thereafter, performing the correction of lightness value which allows the highest chroma point of the color gamut in which compression or extension of the chroma has been transformed to coincide with said common region highest chroma point, in said lightness correcting step; and thereafter, compressing or extending the color gamut which has been corrected in said lightness correcting step to transform it into the common region of the color gamut of said first image input/output device and said second image input/output device thereby performing the method of compressing/extending the color reproducing space for each hue plane, in said lightness compressing/extending step.

13. The method of compressing/extending the color reproducing space according to claim 4, further comprising the steps of:

determining a chroma value $C_1$ on an edge of the color gamut of said second image input/output device having a same lightness value as that of said highest chroma point of the color gamut of said first image input/output device in the same hue plane on the uniform color space, before said chroma compressing/extending step is performed;

determining a chroma value $C_2$ of a common region highest chroma point having the maximal chroma value in the common region of the color gamuts of said first image input/output device and said second image input/output device in said same hue plane;

determining a chroma value $C_3$ of the highest chroma point of the color gamut of said second image input/output device in said same hue plane;

setting said adjusting parameter for adjusting a chroma range in which a range between said chroma value $C_1$ and said chroma value $C_3$ is a maximal adjustable range with said chroma value $C_2$ being in the center among the thus determined chroma values;

determining a chroma value by interpolation from said chroma value $C_1$, chroma value $C_2$ and chroma value $C_3$ using the thus determined adjusting parameter, determining a point nearer to the lightness value of said highest chroma point on the edge of the color gamut of said second image input/output device having the thus determined chroma value and then setting the thus determined point as a corrected highest chroma point;

performing, in said chroma compressing/extending step, compression or extension in which the chroma value of the highest chroma point of the color gamut to be compressed or extended is the chroma value of said corrected highest chroma point on the color gamut of said first image input/output device; and thereafter, performing, in said lightness correcting step, the lightness correction which allows the lightness value of the highest chroma point of the color gamut to coincide with the lightness value of said corrected highest chroma point on the color gamut in which chroma has been compressed or extended to be transformed.

14. The method of compressing/extending the color reproducing space according to claim 13, wherein said lightness compressing/extending step further comprises the stages of:

determining the color gamut belonging to both of the common region of color gamut of said first image input/output device and the color gamut of said second image input/output device in the same hue plane on the uniform color space and the color gamut in which lightness correction has been performed in said lightness correcting step as a coincidence emphasis region;

determining the color gamut obtained by replacing a portion of the edge within the color gamut of said second image input/output device with a curve which is present outside said coincidence emphasis region and inside the color gamut of said second image input/output device, curves in the color gamut of said second image input/output device in a non-linear manner as the chroma value becomes larger starting from 0 and reaches said corrected highest chroma point at the chroma value of said corrected highest chroma point as a color gamut emphasis region;

obtaining a corrected lightness region for each hue plane by interpolation from said adjusting parameter which adjust a set lightness region using the thus determined color gamut emphasis region and said coincidence emphasis region; and thereafter, compressing or extending in said lightness compressing/extending step, the color gamut which has been corrected in said lightness correcting step and transformed into said corrected lightness region thereby performing the method of compressing/extending the color reproducing space for each hue space.

15. The method of compressing/extending the color reproducing space according to claim 1, wherein a transformation of compression or extension to be performed in said chroma compressing/extending step or said lightness compressing/extending step is a transformation represented in the following equation as a standardized value of from 0 to 1 before the transformation is denoted by X; a standardized value of from 0 to 1 after the transformation is denoted by F:

$$F=(k-1)\cdot X^2+X \qquad (1)$$

wherein k denotes compression/extension ratio.

16. A method of compressing/extending a color reproducing space, comprising the step of:

before the color reproducing space is compressed or extended such that the color reproducing space of a first image input/output device is transformed into the color reproducing space of a second image input/output device having a different shape or size of the color reproducing space, correcting an edge shape of a color gamut of said second image input/output device in accordance with an edge shape of a color gamut of said first image input/output device, wherein a central color reproducing space where said first image input/output device and said second image input/output device overlap and a peripheral color reproducing space where said first image input/output device and said second image input/output device do not overlap, are both compressed or extended.

17. A method of compressing/extending a color reproducing space comprising the step of:

before the color reproducing space is compressed or extended such that the color reproducing space of a first image input/output device is transformed into the color reproducing space of a second image input/output device having a different shape or size of the color reproducing space, correcting a non-linear portion of an edge shape of a color gamut of said first image input/output device or said second image input/output device in a linear manner, wherein a central color reproducing space where said first image input/output device and said second image input/output device overlap and a peripheral color reproducing space where said first image input/output device and said second image input/output device do not overlap, are both compressed or extended.

18. A method of compressing/extending a color reproducing space, comprising the steps of:

when the color reproducing space is compressed or extended such that the color reproducing space of a first image input/output device is transformed into the color reproducing space of a second image input/output device having a different shape or size of the color reproducing space, providing an adjusting parameter of adjusting at least one of a hue, a chroma range and a lightness region for the purpose of adjusting the color reproducing space; and then adjusting at least one of corresponding a hue, the chroma range and the lightness region of the color reproducing space to transform into by compression or extension, wherein a central color reproducing space where said first image input/output device and said second image input/output device overlap and a peripheral color reproducing space where said first image input/output device and said second image input/output device do not overlap, are both compressed or extended.

19. A method of compressing/extending a color reproducing space, according to claim 16, wherein each color representaion of a color reproducing space is compressed or extended.

20. A method of compressing/extending a color reproducing space according to claim 17, wherein each color representaion of a color reproducing space is compressed or extended.

21. A method of compressing/extending a color reproducing space according to claim 18, wherein each color representation of a color reproducing space is compressed or extended.

22. A method of compressing/extending a color reproducing space according to claim 17, wherein said correction is performed on the highest chroma point so that the highest chroma point is clearly defined.

23. A method of compressing/extending a color reproducing space for transforming a color reproducing space of a first image input/output device into a color reproducing space of a second image input/output device, comprising:

a lightness correcting step for correcting lightness of the color gamut compressed or extended by a chroma compressing/extending step, said lightness correcting step not executing correction of the lightness when a chroma value is 0, correcting a highest chroma point having a maximal chroma value of said compressed or extended color gamut to a specified point in the color gamut represented in said same hue plane of the color reproducing space of said second image input/output device when said chroma value is the maximal chroma value and correcting the lightness such that a correction amount of the lightness changes in a non-linear manner as the chroma value becomes higher when the chroma value is within a range of from more than 0 to less than said maximal chroma value.

24. A method of compressing/extending a color reproducing space according to claim 16, wherein said edge shape of a color gamut of the second image input/output device is corrected to correct offset of primary colors of the first image input/output device in relation to primary colors of the second image input/output device.

25. A method of compressing/extending a color reproducing space according to claim 16, wherein said edge shape of a color gamut of the second image input/output device is corrected by smoothing said edge shape with a curve such that the edge form of the color gamut of the second input/output device has a bend.

26. A method of compressing/extending a color reproducing space according to claim 17, wherein said non-linear correction is performed such that a color gamut is set by replacing the non-linear portion with a direct line to clearly define a highest chroma point.

27. The method of compressing/extending the color reproducing space according to claim 18, further comprising the steps of:
   determining a chroma value C1 on an edge of a color gamut of said second image input/output device having a same lightness value as that of said highest chroma point of a color gamut of said first image input/output device in a same hue plane on a uniform color space, before said chroma compressing/extending step is performed;
   determining a chroma value C2 of a common region highest chroma point having the maximal chroma value in a common region of the color gamuts of said first image input/output device and said second image input/output device in said same hue plane;
   determining a chroma value C3 of the highest chroma point of the color gamut of said second image input/output device in said same hue plane;
   setting said adjusting parameter for adjusting a chroma range in which a range between said chroma value C1 and said chroma value C3 is a maximal adjustable range with said chroma value C2 being in the center among the thus determined chroma values;
   determining a chroma value by interpolation from said chroma value C1, chroma value C2 and chroma value C3 using the thus determined adjusting parameter, determining a point nearer to the lightness value of said highest chroma point on the edge of the color gamut of said second image input/output device having the thus determined chroma value and then setting the thus determined point as a corrected highest chroma point;
   performing, in said chroma compressing/extending step, compression or extension in which the chroma value of the highest chroma point of the color gamut to be compressed or extended is the chroma value of said corrected highest chroma point on the color gamut of said first image input/output device; and thereafter,
   performing, in a lightness correcting step, the lightness correction which allows the lightness value of the highest chroma point of the color gamut to coincide with the lightness value of said corrected highest chroma point on the color gamut in which chroma has been compressed or extended to be transformed.

28. The method of compressing/extending the color reproducing space according to claim 27, wherein said lightness compressing/extending step further comprises the stages of:
   determining the color gamut belonging to both of the common region of color gamut of said first image input/output device and the color gamut of said second image input/output device in the same hue plane on the uniform color space and the color gamut in which lightness correction has been performed in said lightness correcting step as a coincidence emphasis region;
   determining the color gamut obtained by replacing a portion of the edge within the color gamut of said second image input/output device with a curve which is present outside said coincidence emphasis region and inside the color gamut of said second image input/output device, curves in the color gamut of said second image input/output device in a non-linear manner as the chroma value becomes larger starting from 0 and reaches said corrected highest chroma point at the chroma value of said corrected highest chroma point as a color gamut emphasis region;
   obtaining a corrected lightness region for each hue plane by interpolation from said adjusting parameter which adjust a set lightness region using the thus determined color gamut emphasis region and said coincidence emphasis region; and thereafter,
   compressing or extending in said lightness compressing/extending step, the color gamut which has been corrected in said lightness correcting step and transformed into said corrected lightness region thereby performing the method of compressing/extending the color reproducing space for each hue space.

29. A method of compressing/extending a color reproducing space according to claim 16, wherein said edge shape of the color gamut of the second image input/output device is corrected so as to be smooth with a curve in the neighborhood of an edge portion of said edge shape of the color gamut of the second image input/output device corresponding to an edge portion of said edge shape of the color gamut of the first image input/output device such that said edge shape of the color gamut of the second input/output device has a bend at a hue angle substantially the same as a hue angle of said edge portion of said edge shape of the color gamut of the first image input/output device, said bend being a corrected edge portion of said edge shape of the color gamut of the second image input/output device.

30. A method of compressing/extending a color reproducing space according to claim 29, wherein said edge shape of the color gamut of the second image input/output device has plural edge portions and is corrected in the neighborhood of at least one of said plural edge portions, and said edge shape of the color gamut of the first image input/output device also has plural edge portions corresponding to said plural edge portions of said edge shape of the color gamut of the second image input/output device.

31. A method of compressing/extending a color reproducing space according to claim 29, wherein said edge portion of said edge shape of the color gamut of the first image input/output device corresponds to each of primary colors.

32. A method of compressing/extending a color reproducing space according to claim 31, wherein said primary colors correspond to cyan, magenta and yellow and/or red, green and blue.

33. A method of compressing/extending a color reproducing space for transforming a color reproducing space of a first image input/output device into a color reproducing space of a second image input/output device, comprising:
   a chroma compressing/extending step which compresses or extends chroma of a color gamut of the first image input/output device represented within the same hue plane in a uniform color space in said same hue plane; and
   a lightness correcting step for correcting lightness of the color gamut compressed or extended by the chroma compressing/extending step, said lightness correcting step not executing correction of the lightness when a chroma value is 0, correcting a highest chroma point having a maximal chroma value of said compressed or extended color gamut to a specified point in the color gamut represented in said same hue plane of the color reproducing space of said second image input/output device when said chroma value is the maximal chroma value and correcting the lightness such that a correction amount of the lightness changes in a non-linear manner as the chroma value becomes higher when the chroma value is within a range of from more than 0 to less than said maximal chroma value.

34. A method of compressing/extending a color reproducing space, according to claim 18, wherein adjusting the lightness region comprises preliminary subtraction of a minimal lightness value from the color reproducing space, and color transformation using a von Kries method for chromatic adapation transformation.

35. A method of compressing/extending a color reproducing space, according to claim 18, wherein adjusting a chroma range comprises compressing or extending chroma of a color gamut of the first image input/output device represented within the same hue plane in a uniform color space in said same hue plane.

36. A method of compressing/extending a color reproducing space, according to claim 18, wherein adjusting the lightness regions comprises correcting a highest chroma point having a maximal chroma value of a compressed or extended color gamut to a specified point in the color gamut represented in a same hue plane of the color reproducing space of said second image input/output device when said chroma value is the maximal chroma value and correcting the lightness such that a correction amount of the lightness changes in a non-linear manner.

37. The method according to claim 17, wherein a chroma range, a lightness, and a hue in the overlapping region and the non overlapping region are compressed or extended.

38. The method according to claim 16, wherein the method produces a color image output.

39. The method according to claim 16, further comprising outputting an image of the method to one of a printer and a monitor.

40. The method according to claim 16, further comprising pretreatment of a hue value, a chroma value and a lightness value of the color reproducing space via interpolation.

41. The method according to claim 17, further comprising pretreatment of a hue value, a chroma value and a lightness value of the color reproducing space via interpolation.

* * * * *